US012726446B2

(12) United States Patent
Blankenstein et al.

(10) Patent No.: US 12,726,446 B2
(45) Date of Patent: Sep. 1, 2026

(54) GENERATING MISSION-SPECIFIC ANALYTICS INFORMATION

(71) Applicant: Modirum Gespi Oy, Espoo (FI)

(72) Inventors: Juho Blankenstein, Tampere (FI); Mattipekka Kronqvist, Tampere (FI)

(73) Assignee: Modirum Gespi Oy, Tampere (FI)

(*) Notice: Subject to any disclaimer, the term of this patent is extended or adjusted under 35 U.S.C. 154(b) by 545 days.

(21) Appl. No.: 17/933,293

(22) Filed: Sep. 19, 2022

(65) Prior Publication Data

US 2023/0403240 A1 Dec. 14, 2023

(30) Foreign Application Priority Data

Jun. 9, 2022 (FI) ..................................... 20225504

(51) Int. Cl.
*H04L 47/62* (2022.01)

(52) U.S. Cl.
CPC .................................... *H04L 47/62* (2013.01)

(58) Field of Classification Search
CPC ......... H04L 47/62; H04L 67/62; H04L 67/12; H04L 47/562; H04L 47/6295; H04L 67/60; H04L 47/193; H04L 43/0817; H04L 43/0882; H04L 43/16; H04L 47/24; H04L 47/30; H04L 41/0816; H04L 43/0852; H04L 43/0894; H04L 47/38; H04L 47/263; H04L 47/6245; H04L 47/626; H04L 47/18; H04L 47/10; H04L 47/2416; H04L 49/90;

(Continued)

(56) References Cited

U.S. PATENT DOCUMENTS

2009/0048994 A1* 2/2009 Applebaum ...... G06F 16/24573 706/45
2010/0061238 A1* 3/2010 Godbole ............... H04L 47/263 370/235

(Continued)

FOREIGN PATENT DOCUMENTS

CN 113033492 A 6/2021
CN 113572997 A 10/2021

(Continued)

OTHER PUBLICATIONS

International Search Report of corresponding application PCT/FI2023/050327; mailed Aug. 30, 2023; 5 pages.
Wu, Y. and Liu L. Parallel Detection for Efficient Video Analytics at the Edge. 2021 IEEE Third International Conference on Cognitive Machine Intelligence (CogMI), pp. 204-213.
Wikipedia, Adaptive bitrate streaming [online]., Retrieved Apr. 22, 2022; 10 pages.

(Continued)

*Primary Examiner* — Dady Chery
(74) *Attorney, Agent, or Firm* — Meunier Carlin & Curfman LLC

(57) ABSTRACT

There is provided receiving mission time accurate data frames from the one or more source nodes, assigning one or more source nodes to one or more missions, assigning one or more analytics recipes to each of the one or more missions for generating mission-specific analytics information based on the mission time accurate data frames received from one or more source nodes assigned to each of the one or more missions, generating processing jobs for processing the mission time accurate data frames received from one or more source nodes assigned to specific missions, wherein the processing jobs are assigned to recipe-specific processing queues of the one or more analytics recipes assigned to the specific missions.

20 Claims, 13 Drawing Sheets

(58) Field of Classification Search
CPC ...... G06N 3/045; G06N 3/0464; G06N 20/00; G06V 10/16; H04W 24/02
See application file for complete search history.

(56) References Cited

U.S. PATENT DOCUMENTS

| | | | | |
|---|---|---|---|---|
| 2019/0158371 | A1* | 5/2019 | Dillon | H04L 47/196 |
| 2020/0389387 | A1 | 12/2020 | Magzimof | |
| 2022/0200909 | A1* | 6/2022 | Kronqvist | H04L 43/16 |

FOREIGN PATENT DOCUMENTS

| | | | |
|---|---|---|---|
| EP | 2854442 | A1 | 4/2015 |
| WO | 2018175551 | A1 | 9/2018 |

OTHER PUBLICATIONS

Lee et al; RAVIP; Real-Time Al Vision Platform for Heterogeneous Multi-Channel Video Stream. In: Journal of Information Processing Systems. Korea Information Processing Society, Apr. 2021, vol. 17, pp. 227-241.

Patrascu et al; Scalable Deployments for Real-Time AI Video Stream Processing. 2022 21st RoEduNet Confernce: Networking in Education and Research, Sovata, Romania: IEEE, Oct. 21, 2022, pp. 1-6.

Finnish Patent and Registration Office, Office action regarding corresponding application 20225504, dated on Jan. 9, 2023. 12 pages.

* cited by examiner

100
Data source 102
Data source 104
Data source 106
133 Router
134, 136
136
132
134
Server 120 / cloud
Server 122/ cloud
Viewer node 112
Viewer node 113
Viewer node 114
Viewer node 115
Viewer node 116
Viewer node 118

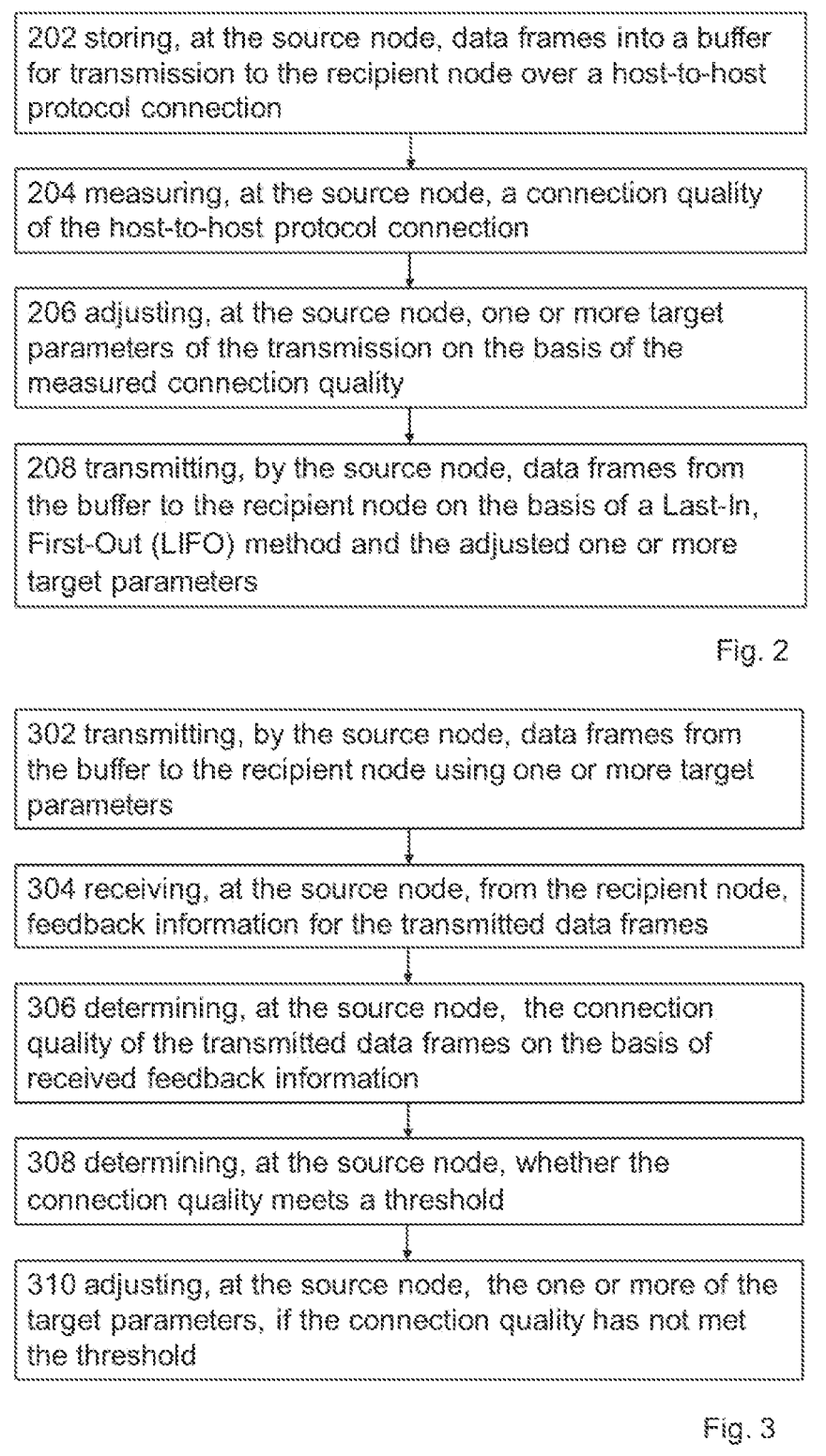

202 storing, at the source node, data frames into a buffer for transmission to the recipient node over a host-to-host protocol connection 204 measuring, at the source node, a connection quality of the host-to-host protocol connection 206 adjusting, at the source node, one or more target parameters of the transmission on the basis of the measured connection quality 208 transmitting, by the source node, data frames from the buffer to the recipient node on the basis of a Last-In, First-Out (LIFO) method and the adjusted one or more target parameters

Fig. 2

302 transmitting, by the source node, data frames from the buffer to the recipient node using one or more target parameters 304 receiving, at the source node, from the recipient node, feedback information for the transmitted data frames 306 determining, at the source node, the connection quality of the transmitted data frames on the basis of received feedback information 308 determining, at the source node, whether the connection quality meets a threshold 310 adjusting, at the source node, the one or more of the target parameters, if the connection quality has not met the threshold

Fig. 3

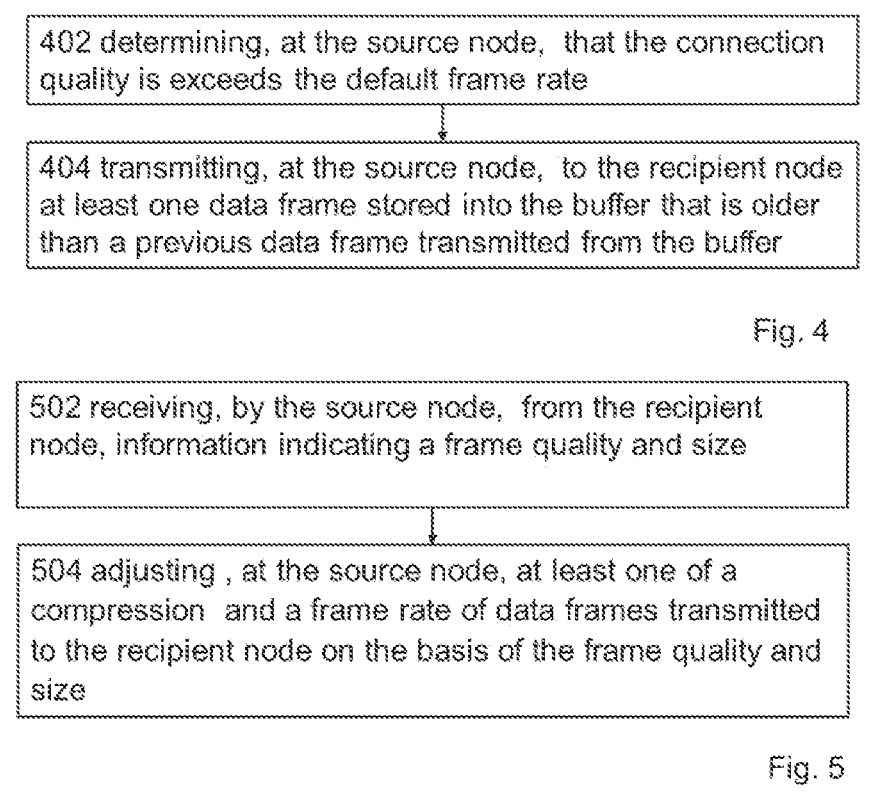

402 determining, at the source node, that the connection quality is exceeds the default frame rate 404 transmitting, at the source node, to the recipient node at least one data frame stored into the buffer that is older than a previous data frame transmitted from the buffer

Fig. 4

502 receiving, by the source node, from the recipient node, information indicating a frame quality and size 504 adjusting , at the source node, at least one of a compression and a frame rate of data frames transmitted to the recipient node on the basis of the frame quality and size

Fig. 5

902 determining at least one of an end of data flow and an increased bandwidth to the recipient node 904 purging the transmission buffer to the recipient node

| Viewer node | Frame rate | Compression parameter | Quality (resolution) | Compression format |
|---|---|---|---|---|
| Audio player Software | 20ms – 1000ms | Compression efficiency parameter | 8kHz – 48kHz | Opus, MP3, AAC |
| Video player Software | 1 – 30 fps | Compression efficiency parameter | 320p – 4k | Webp, Jpeg, H264, H265 |
| Analytics Software | Scalable frame rate requirements | static | static | any |

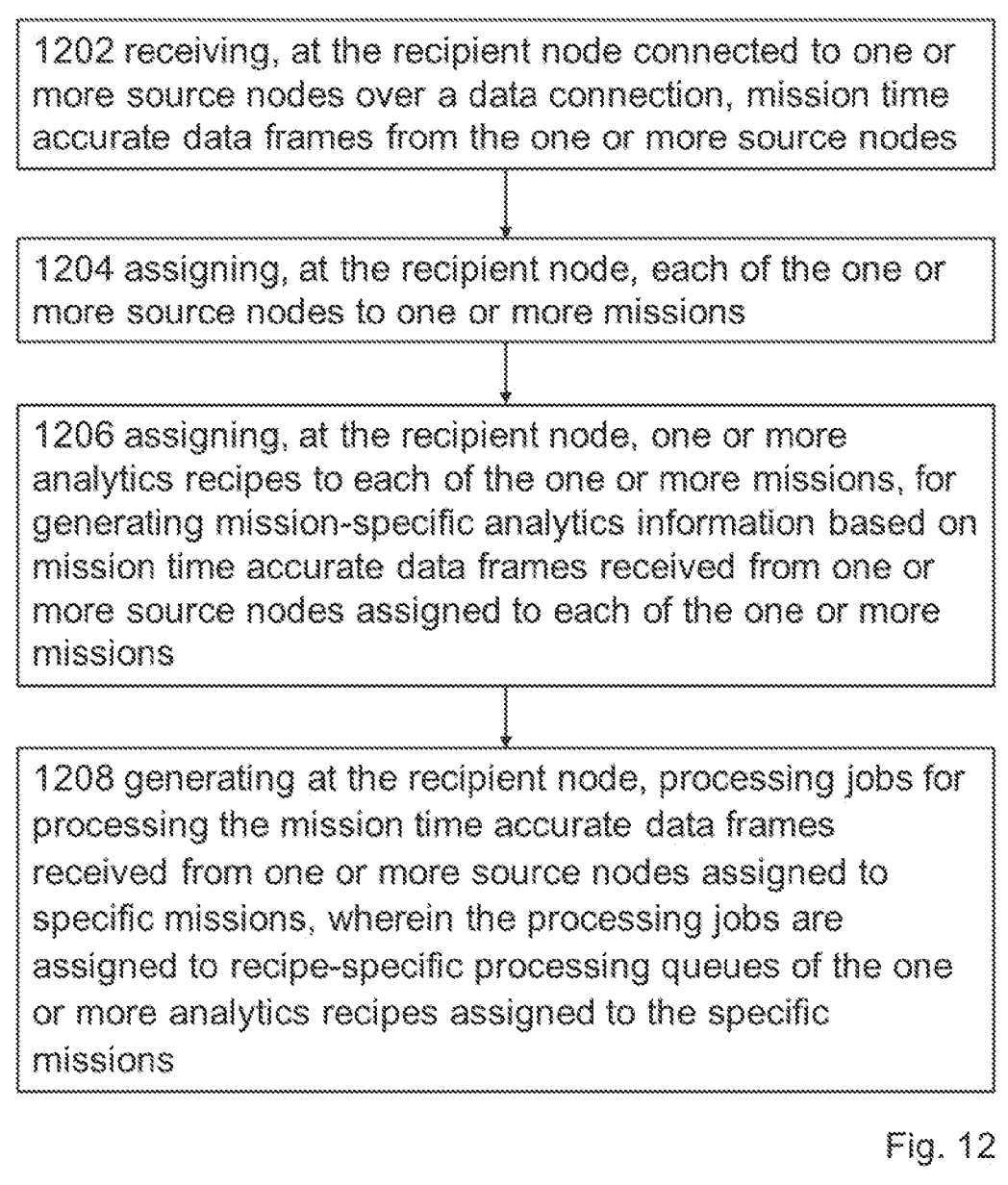

1202 receiving, at the recipient node connected to one or more source nodes over a data connection, mission time accurate data frames from the one or more source nodes 1204 assigning, at the recipient node, each of the one or more source nodes to one or more missions 1206 assigning, at the recipient node, one or more analytics recipes to each of the one or more missions, for generating mission-specific analytics information based on mission time accurate data frames received from one or more source nodes assigned to each of the one or more missions 1208 generating at the recipient node, processing jobs for processing the mission time accurate data frames received from one or more source nodes assigned to specific missions, wherein the processing jobs are assigned to recipe-specific processing queues of the one or more analytics recipes assigned to the specific missions

Fig. 12

GENERATING MISSION-SPECIFIC ANALYTICS INFORMATION

TECHNICAL FIELD

The present invention relates to generating mission-specific analytics information for data frames.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Real-time communications of data from a source node to a recipient node enables the recipient node to have the most recent data generated at the source node. Quality of the real-time data may be insufficient if the data rate supported between the source node and the recipient node is too low for high-quality data. The source node and the recipient node may connect over more than one data link that may be over wired or wireless connections, whereby variance of the data rate supported between the source node and the recipient node may be relatively high.

In a mission, events are tracked using a time-frame of the mission. Source nodes that participate in the mission support an up-to-date situational awareness by the real-time communications of data. The real-time communications of data enables the recipient node to associate the most recent data generated at the source node to time instants of the mission time-frame. However, the data generated at the source nodes can be unprocessed, or raw, data, that does not identify the tracked events. Processing the data, or performing analytics on the data, for detecting the tracked events at the source nodes would delay delivery of the data to the recipient node. On the other hand, processing the data, or performing analytics on the data, for detecting the tracked events at the recipient node also involves a delay. Therefore, the processing required for detecting the tracked event does not support the up-to-date situational awareness.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which:

FIG. 2 illustrates an example of a method in accordance with at least some embodiments;

FIG. 3 illustrates an example of a method in accordance with at least some embodiments;

FIG. 4 illustrates an example of a method in accordance with at least some embodiments;

FIG. 5 illustrates an example of a method in accordance with at least some embodiments;

FIG. 11 illustrates examples of target parameters for viewer nodes;

FIG. 12 illustrates an example of a method in accordance with at least some embodiments;

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

A mission is a computer implemented instance of a real-life operational scenario involving one or more data sources and viewer nodes configured to communicate data frames over data connections with a computerized service platform, e.g. a server. The mission may be maintained at the computerized service platform that may implement at least part of the functionalities of a source node and a viewer node during the mission. At the computerized service platform, the mission may be configured to monitor events during a course of the mission based on one or more analytics recipes, or in short recipes, assigned to the mission. The mission provides one or more user interfaces for user. The user interfaces may be provided on the viewer nodes. The users may monitor the mission through the user interfaces based on data frames, e.g. image data frames and/or video data frames, received from the source nodes and analytics information generated by the recipes and presented on the user interface. The analytics information is generated based on recipe-specific processing queues, whereby the mission can support up-to-date situational awareness.

Figure 1:
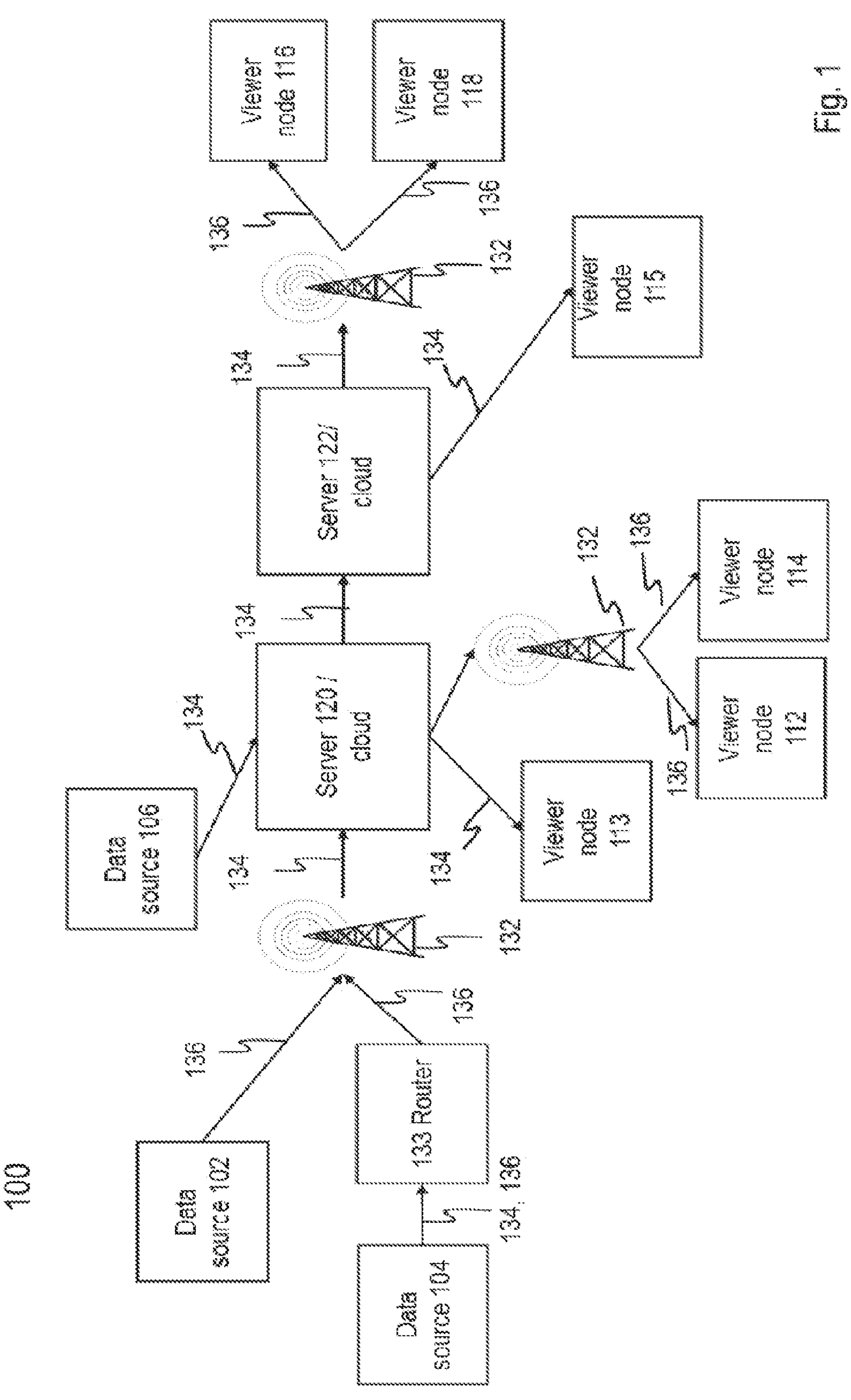
FIG. 1 illustrates an example of a communications system for communications of data flow in accordance with at least some embodiments.

A data connection may be provided by a communications system between data sources, viewer nodes and servers for example as described with FIG. 1.

A mission time accurate data frame is a data frame that is a latest data frame generated during a mission by a source node. The source node generates the data frame and transmits the data frame to a recipient node based on a Last-In, First-Out (LIFO) method. In this way the recipient node may associate the most recent data frame generated at the source node to time instants of a mission time-frame. In the following, the term mission time accurate data frames is used interchangeably with the term data frames.

A mission time-frame, or a global time, refers to a time-frame that is common to all devices participating in a mission. The mission time-frame applies to events, data frames and analytics information that are generated and take place during the mission. This allows tracing back events and data frames of the mission after the mission has been completed as well as monitoring the events and data frames during the mission. The events may be identified by analytics information generated during the mission. Examples of the events comprise at least detection of an object in a data frame received from a source node. A detected object may be a set of data, e.g. pixels, in a data frame, such as an image data frame or a video data frame. The detected objects may be indicated by highlighting the detected objects, e.g. by applying a color or a bounding box to the set of data corresponding to the object in the data frame. Therefore, during a live mission, at each time instant of the mission time-frame, controlling a delay between data frames of a time instant of the mission time-frame and analytics information generated based on the data frames is needed for supporting up-to-date situational awareness during the mission.

Mission-specific analytics information is generated by a recipe and the mission-specific analytics information is specific to a mission. The mission-specific analytics information is generated based on a mission-specific rule. The mission-specific rule may determine one or more recipes that are used to process data frames received from one or more source nodes assigned to the mission. Additionally, the mission-specific rule may determine one or more parameters, e.g. input parameters, for the one or more recipes. Examples of the parameters comprise at least reliability levels that are applied to each of the recipes. The parameters may control execution of the recipe. Therefore, the parameters may affect the processing load of the recipe. In an example, the one or more parameters may control processing of data frames input to a recipe. In an example, the one or more parameters may control processing of data frames output from a recipe. A recipe is a component of a software architecture and may be implemented by computer program code stored on at least one memory and configured with at least one processing core to generate analytics information based on data frames, or mission time accurate data frames, received from one or more source nodes. Examples of the recipes comprise at least algorithms, neural networks such as a convolutional neural network (CNN), and their combinations. The recipe may be configured to generate analytics information based on data frames based on well-known data processing principles. In an example implementation of the recipe, the recipe may be a combination of one convolutional neural network (CNN) configured to perform object detection from image and/or video data frames received from source nodes and another CNN configured to generate proposals for detected objects in the image and/or video frames. The first CNN may output extracted feature maps that are used as input to the second CNN. The second CNN then generates a set of object proposals, each with a score indicating a reliability of an object proposals output. Accordingly, the object proposals may be the analytics information generated by the recipe. An example of an object detection network is YOLO, e.g. YOLOv5 https://github.com/ultralytics/yolov5. The reliability level of the second CNN may be a mission-specific parameter determined for the recipe.

Processing job may be a definition of a task to be carried out by a recipe. Processing jobs may be queued in queues. Each queue may be specific to a recipe. The processing jobs may be processed from the queue based on a First-In-First-Out method.

FIG. 1 illustrates a communications system 100 for communications of data flow in accordance with at least some embodiments. The communications system may comprise one or more data sources 102, 104, 106 and one or more viewer nodes 112, 113, 114, 115 116, 118. The data sources and viewer nodes may be connected to one or more servers 120, 122. The servers may be implemented as cloud servers and referred to clouds. Connections between the data sources and the servers, and connections between the servers and the viewer nodes may comprise one or more routers 133, wired data links 134, wireless data links 136, radio access networks 132, local area networks, sub-networks and/or wide area networks. accordingly, the connections may be heterogenous, whereby connections between each data source and viewer node may have different capabilities, for example in terms of the physical communications medium being a wireless medium or a wireless medium, in terms of supported data rates, delay performance and delay variance. The servers may be connected to the internet, whereby the data sources transmit data frames to the servers provided the data sources have internet connectivity and the viewer nodes may be delivered data frames from the servers provided viewer nodes have internet connectivity. Examples of the wired data links 134 comprise at least Ethernet cables and fiber optic cables. Examples of the wireless data links 136 comprise at least wireless access links and wireless backhaul links of cellular radio access networks, relay links and wireless bridges. A cellular radio access network may be according to a cellular communications technology such as 3G, 4G or 5G defined by the 3GPP. Examples of the viewer nodes comprise user devices that comprise a user interface via which a user may consume content rendered on the basis of the communicated data flow. A user device may be user equipment of a mobile communications system, such as a mobile phone. On the other hand a user device may be a computer workstation. It should be noted that the data sources may serve at least for source nodes in accordance with at least some embodiments described herein. It should be noted that the viewer nodes may serve at least for recipient nodes in accordance with at least some embodiments described herein. It should be noted that the servers may serve for source nodes and/or recipient nodes in accordance with at least some embodiments described herein. Connections between the source nodes and recipient nodes may comprise host-to-host protocol connections.

A host-to-host protocol provides communications of data frames over a connection between communicating endpoints, in this case a source node and a recipient node that host protocol entities of the host-to-host protocol. At the source node, data frames may be generated to be transmitted to the recipient node. At the recipient node, data frames received from the source node may be consumed. In an example, at the recipient node the data frames may be processed by an analytics software application for machine-based processing the data frames from the source node and/or a software application for consuming the data frames by a user. In an example, the data frames may be processed by the software application that causes, playing the data frames in audio, video or displaying the data frames in still images, graphics and/or textual formal to the user. Examples of the host-to-host protocol connections comprise at least Transmission Control Protocol (TCP) connections, User Datagram Protocol (UDP) connections, transport layer protocol connections and connections on protocol layers above the transport protocol layer. Connections on protocol layers above the transport protocol layer comprise at least application layer protocol connections. Accordingly, both the source node and the recipient node may host a protocol stack that comprises a host-to-host protocol, for example a transport layer protocol, e.g. the TCP or UDP, or a protocol above the transport layer, for communications of data frames between the source node and the recipient node.

Data flow may refer to real-time data that is generated at a source node. The real-time data may be generated by a Data Frame Generator (DFG). The DFG may be configured to generate data frames comprising still images, video and/or other computer-readable data such as positioning data. A data frame may comprise a header and a payload that carries the content, i.e. the still images, video and/or other computer-readable data such as positioning data. The header may comprise information for identifying the content, for example information identifying a compression format of the content and a source node of the content, a quality of the content and a size of the content. The header enables at least consuming the content at a recipient node. In an example, the quality and size of the content may be defined by a resolution. The resolution may be e.g. a resolution of still images or video. However, it should be noted that computer-readable data representing other content, such as positioning data, may be encoded into data frames by a Data Frame Generator (DFG). Examples of the DFG comprise at least a still camera, a video camera and a positioning device, a camera application and a positioning application. The positioning device and positioning application may be configured to generate positioning data, for example Global Positioning System (GPS) data.

An example of generating real-time data comprises at least generating data frames on the basis of data from a data source. Examples of data sources comprise at least a digital camera, a video camera and a positioning system (POS). A DFG may comprise a data source or be connected to one or more of the data sources for generating real-time data. Accordingly, the data from a data source may comprise at least data captured by a digital camera, a video camera and/or a positioning system.

Real-time data may be captured at a source node for transmission by the source node to a recipient node. The real-time data may be stored to a transmission buffer hosted by the source node, where the real-time data may be retrieved for transmission to the recipient node. The real-time data may be transmitted from the source node to the recipient node without storing the real-time data for offline processing at source node. Real-time data stored to the transmission buffer may be managed on the basis of Last-In, First-Out (LIFO) method, where a unit or frame of real-time data stored to the buffer last is the first unit or frame of real-time data retrieved for transmission to the recipient node. In practice, real-time data may be stored to the transmission buffer at a free position (POS) of the buffer whereby a memory pointer to the free position may be updated to the next free position (POS+1). When a transmission is scheduled from the source node to the recipient node, the real-time data to be transmitted to the recipient node is retrieved from the buffer at (POS−1) that points to the real-time data that has been stored to the transmission buffer the last. In this way the recipient node may be provided real-time data, whenever the transmission is scheduled to from the source node to the recipient node. It should be noted that if a frame rate from the source node to the recipient node is slow, e.g. less than a target frame rate at which data frames are generated and stored to the transmission buffer, data frames are accumulated to the transmission buffer over time. It should be noted that if frame rate from the source node to the recipient node is high, e.g. higher than a target frame rate at which data frames are generated and stored to the transmission buffer, the transmission buffer is drained over time.

Viewer nodes may be host-to-host protocol endpoints at a server and/or at user devices. The viewer nodes are recipient nodes of data frames from source nodes. Examples of the viewer nodes at the server comprise at least analytics software applications for machine-based processing the data frames from the source node. Examples of the viewer nodes at the user devices comprise software applications, e.g. audio players, video players, that are operatively connected to one or more user interface devices configured at least for audio and/or video output to user. The software applications may be configured to cause rendering/playing content included to the data frames on the user devices such that the user may consume the content.

Up-to-date situational awareness is used herein to refer to a recipient node being provided data frames of a data flow from one or more source nodes which enable the recipient node to have at each time instant the latest data frame generated by the source nodes. In various embodiments described herein the situational awareness is provided by real-time communications of data frames with sufficient quality between the source nodes and the recipient node. In this way the recipient node and a user of the recipient node may have the latest data frame from each of the source nodes within a controlled delay after the data frames have been generated at each of the source nodes.

FIG. 2 illustrates a method in accordance with at least some embodiments. The method provides managing a data flow between a source node and a recipient node. The method may be performed by the source node. The method supports up-to-date situational awareness by real-time communications of data frames with sufficient quality between the source node and the recipient node.

Phase 202 comprises storing, at the source node, data frames into a buffer for transmission to the recipient node over a host-to-host protocol connection.

Phase 204 comprises measuring, at the source node, a connection quality of the host-to-host protocol connection.

Phase 206 comprises adjusting, at the source node, one or more target parameters of the transmission on the basis of the measured connection quality. Examples of the target parameters comprise at least a target frame rate, quality and compression format for the data frames.

Phase 208 comprises transmitting, by the source node, data frames from the buffer to the recipient node on the basis of a Last-In, First-Out (LIFO) method and the adjusted one or more target parameters. The latest data frame is transmitted to the recipient, even if frame rate was reduced at phase 206 from a target frame rate, since the data frames are transmitted based on LIFO. Since the data frames are transmitted using the LIFO method, the newest data frame in the buffer is always transmitted to the recipient node. The adjusted target parameters provide that the data frames may be generated at a rate and quality that enables successful reception of the data frames at the recipient node. In this way real-time communications may be supported.

In an example, phase 202 comprises, generating at the source node, the data frames on the basis of one or more target parameters. Examples of the target parameters comprise at least a target frame rate, size, quality and compression format of the data frames. The target parameters provide that generated data frames may be transmitted in real-time to the recipient node in accordance with phase 208. The target parameters may have default values or the target parameters may be determined by the recipient node and used at the source node to set/adjust the parameters used at the source node.

In an example, at phase 202, the data frames may be generated at a target frame rate that allows a generated data frame to be stored to the transmission buffer and transmitted, in accordance with phase 208, before a next data frame according to the frame rate is stored to the transmission buffer. In this way size of the transmission buffer may be kept small. In this example a target size and/or quality of the generated frames may be limited to enable transmitting each data frame before the next is generated using the available bandwidth between the source node and the recipient node.

In an example, at phase 202, the data frames may be generated at a target frame rate that allows storing a selected number of generated data frames to the transmission buffer before transmitting a data frame from the transmission buffer, in accordance with phase 208. In this way size of the transmission buffer may be designed based on the selected number of generated data frames and a selected duration for the data flow. In this example a target size and/or quality of the generated frames may be higher than in the above example since a part of the generated data frames may be stored to the transmission buffer which leaves more time for transmitting the generated data, in accordance with phase 208, at least when the available bandwidth is maintained.

In an example, phase 204 comprises determining the connection quality on the basis of a success rate of real-time delivery of data frames from the source node to the recipient node. The success rate may be determined on the basis of success and/or unsuccessful transmissions of data frames over the host-to-host protocol connection in a time interval. The time interval may be determined sufficiently small such that failed transmissions of the data frames may be remedied by adjusting one or more of the target parameters in accordance with phase 206 and transmitting one or more further data frames using the adjusted one or more of the target parameters in accordance with phase 208, whereby real-time delivery of data frames may be supported over the host-to-host protocol connection. In an example the success rate may be determined at the source node on the basis of feedback information determined for each data frame transmitted over the host-to-host protocol connection. The feedback information may be received from the recipient node in accordance with the host-to-host protocol. In an example the success rate may be determined on the basis of a number of frames in a time interval for which a negative feedback information has been received and/or no feedback information has been received. The success rate may be a percentage value between 0% to 100% or a category a set of success rate categories. In an example, the set of success rate categories comprises a full success rate, a partial success rate and a poor success rate. Following the example of success rate categories, the success rate may be a full success rate, if the number of frames in a time interval for which a negative feedback information has been received and/or no feedback information has been received, is zero. On the other hand, the success rate may be a partial success rate, if the number of frames in a time interval for which a negative feedback information has been received and/or no feedback information has been received, is above zero. On the other hand, the success rate may be a poor success rate, if the number of frames in a time interval for which a negative feedback information has been received and/or no feedback information has been received, is the number of frames transmitted in the time interval, i.e. this indicates that all transmissions have been failed. Accordingly, the success rate may be implemented effectively as a counter that may be evaluated once in the time interval that is set for the success rate.

In an example, the success rate may be evaluated against a threshold for determining a connection quality in phase 204. An example of the threshold is a number of consecutive data frames for which a negative feedback information has been received and/or no feedback information has been received in a time interval. In another example the threshold may be a portion of frames in a time interval or a percentage value of data frame in a time interval for which no negative feedback information has been received and/or feedback information has been received.

In an example, the connection quality in phase 204 may be measured on the basis of feedback information determined for each data frame transmitted over the host-to-host protocol connection. The feedback information may indicate a failure or a success of a transmission of a data frame. If feedback information for a given data frame is not received the feedback information for that data frame may be determined to indicate a failure. In this way a success rate may be determined. For example, the success rate may be a ratio of frames for which feedback information has been received to a total number of frames. It should be noted that the connection quality may be determined on the basis of a selected feedback information. Accordingly, the feedback information for determining the connection quality may at least comprise the feedback information received for frames that have been transmitted after adjusting the one or more parameters the last time.

In an example one or more functionalities of the method described with FIG. 2 may be performed by an apparatus, e.g. a user device, that comprises a single buffer. In such case the apparatus may serve as generator of data frames and delivery of the data frames to a plurality of viewer nodes may be achieved by the apparatus transmitting data frames to a server in accordance with phase 208.

In an example one or more functionalities of the method described with FIG. 2 may be performed by an apparatus, e.g. a server, that manages delivery of data frames from data sources, for example user devices, to viewer nodes. In such case the apparatus may host buffers, i.e. transmission buffers, for transmitting data frames to each of the viewer nodes and data flows to each of the viewer nodes may be managed in accordance to described with phases 202 to 208. In this way real-time data delivery to each of the viewer nodes may be supported based on their individual connection qualities.

FIG. 3 illustrates a method in accordance with at least some embodiments. The method provides managing a data flow between a source node and a recipient node. The method may be performed by the source node for example in connection with one or more phase of the method described with FIG. 2.

Phase 302 comprises transmitting, by the source node, data frames from the buffer to the recipient node using one or more target parameters.

Phase 304 comprises receiving, at the source node, from the recipient node, feedback information for the transmitted data frames.

Phase 306 comprises determining, at the source node, the connection quality of the transmitted data frames on the basis of received feedback information.

Phase 308 comprises determining, at the source node, whether the connection quality meets a threshold.

Phase 310 comprises adjusting, at the source node, the one or more of the target parameters, if the connection quality has not met the threshold.

In this way successful delivery of the data frames at the recipient node may be facilitated, whereby a data frame generated at the source node can be consumed in real-time at the recipient node. The adjusted target parameters provide that the data frames may be generated at a rate and quality that enables successful reception of the data frames at the recipient node. In this way real-time communications may be supported.

In an example, the one or more target parameters at phase 302 comprise a target frame rate that may have been set by the recipient node. The recipient node may e.g. transmit a request to the source node to transmit using the target frame rate.

In an example phase 308 comprises that the threshold is for a success rate of real-time delivery of data frames from the source node to the recipient node. Then in phase 310, if the success rate is not sufficiently high, the frame rate may be adjusted.

In an example phase 310 comprises that a target frame rate is decreased. In this way a number of data frames stored to the buffer may be increased since a fewer data frames are transmitted based on the LIFO method and the decreased frame rate.

FIG. 4 illustrates a method in accordance with at least some embodiments. The method provides managing a data flow between a source node and a recipient node. The method may be performed by the source node. The method may be performed in connection with at least one of the phases described with FIG. 2 and FIG. 3.

Phase 402 comprises determining, at the source node that the connection quality exceeds the one or more of the target parameters.

Phase 404 comprises transmitting, at the source node, to the recipient node at least one data frame stored into the buffer that is older than a previous data frame transmitted from the buffer.

In an example phase 402 comprises determining that a capability of the connection has increased.

In an example phase 402 comprises determining that a quality of the connection has increased. The connection quality may be higher than a threshold. For example, a success rate may be higher than a threshold.

In an example phase 404 comprises that the buffer is emptied from data frames and the data frames are transmitted to the recipient node. In this way the recipient node may reconstruct the data flow to include all the data frames buffered for transmission at the source node.

FIG. 5 illustrates a method in accordance with at least some embodiments. The method provides managing a data flow between a source node and a recipient node. The method may be performed by the source node. The method may be performed in connection with at least one of the phases described with FIG. 2 and FIG. 3.

Phase 502 comprises receiving, by the source node, from the recipient node, information indicating a frame quality and size. In an example, the quality and size may be indicated by a resolution.

Phase 504 comprises adjusting, at the source node, at least one of a compression format and a frame rate of data frames transmitted to the recipient node on the basis of the frame quality and size.

In an example, at phase 502, the frame quality and size may be target parameters determined by the recipient node. Then, at phase 504, the source node may adjust a compression format and a frame rate that are target parameters for data frames transmitted from the source node to the recipient node. The adjusted target parameters provide that the data frames may be generated at a rate and quality that enables successful reception of the data frames at the recipient node. In this way real-time communications may be supported.

Figure 6:
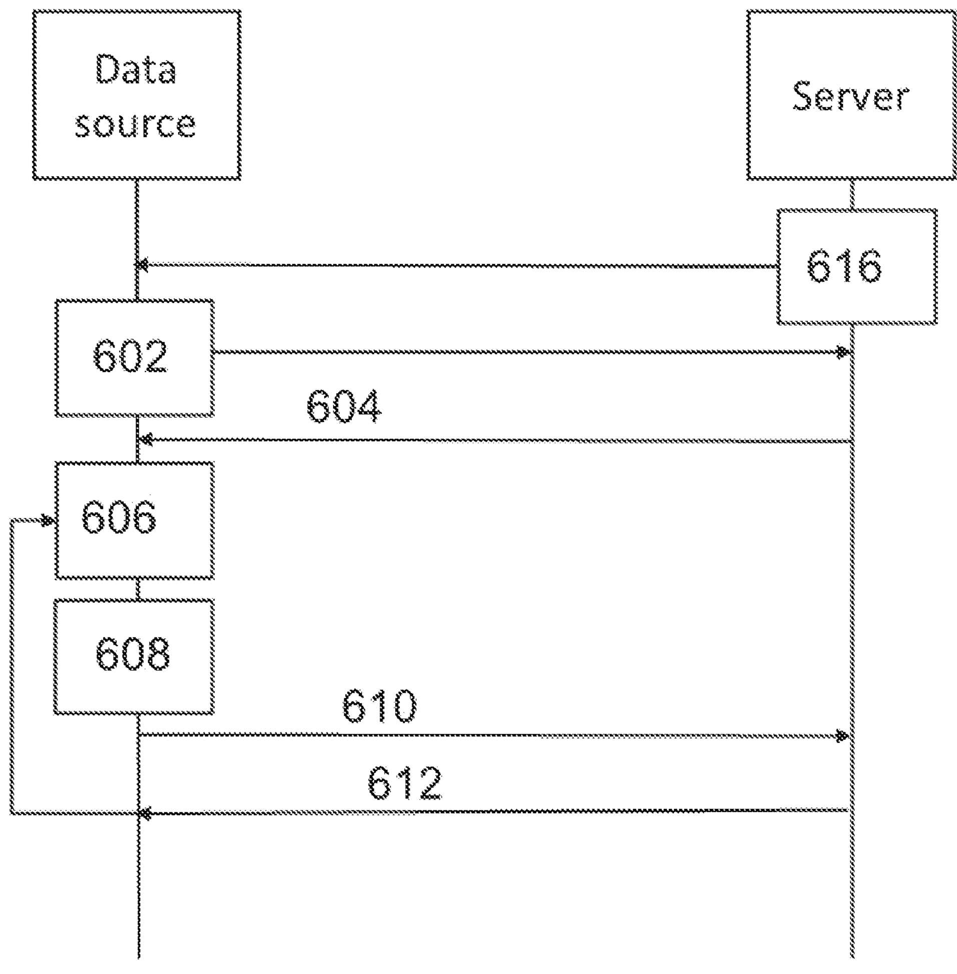
FIG. 6 illustrates an example of a sequence for managing a data flow from a data source to a server in accordance with at least some embodiments.

FIG. 6 illustrates a sequence for managing a data flow from a data source to a server in accordance with at least some embodiments.

Phase 602 comprises the source node transmitting one or more data frames to the server over a host-to-host protocol connection using one or more target parameters. It should be noted that in this connection the server is a recipient node of the host-to-host protocol connection. Examples of the target parameters comprise at least a target frame rate, size, quality and compression format of the data frames.

In an example, the target frame rate, the target size, quality and/or compression format cause generating at the source node data frames that have the target size, quality and/or compression format. The generated frames are stored to the LIFO buffer for transmission to a recipient node. The target size may be the size of the data frame of the host-to-host protocol, e.g. TCP frame or UDP frame. The target quality may be a quality, e.g. resolution, of the payload of the data frames of the host-to-host protocol, e.g. TCP frames or UDP frames. The target compression format may be a lossless compression format or a lossy compression format that has been applied to the payload of the data frames of the host-to-host protocol, e.g. TCP frames or UDP frames.

Phase 604 comprises the server executing the host-to-host protocol between the data source and the server and transmitting an acknowledgement (ACK) in response to the data frames received from the data source. The ACK may be sent in response to each data frame received from the data source. In this way the data source may receive feedback information for the transmitted data frames from the server.

Phase 606 comprises determining, at the data source, a connection quality of the transmitted data frames on the basis of received feedback information. In an example the connection quality may be a success rate of real-time delivery of data frames to the server.

Phase 608 comprises adjusting, at the data source, one or more of the target parameters, if the connection quality has not met a threshold. The threshold may be determined on the basis of one or more of the target parameters or adjusted target parameters. If the threshold has not been met, the adjusting may be omitted.

Phase 610 comprises transmitting, by the data source, data frames to the recipient node on the basis of the one or more target parameters. It should be noted that the one or more of the target parameters may have been adjusted at phase 608.

Phase 612 comprises the data source receiving feedback information for the transmitted data frames from the server. Then, the connection quality may be determined anew at phase 606.

Phase 616 comprises the server determining the one or more target parameters and transmitting information indicating the determined one or more target parameters to the source node. In this way the server may cause adjusting, at the source node, at phase 602, the target parameters for the data frames and cause the data flow from the source node to be in accordance with the adjusted target parameters. The phase 616 may be performed before transmission of the data frames at phase 602, whereby adjusting the one or more target parameters at phase 608, may be reduced or even avoided, after the transmission of the data frames has begun from the source node to the server.

Figure 7:
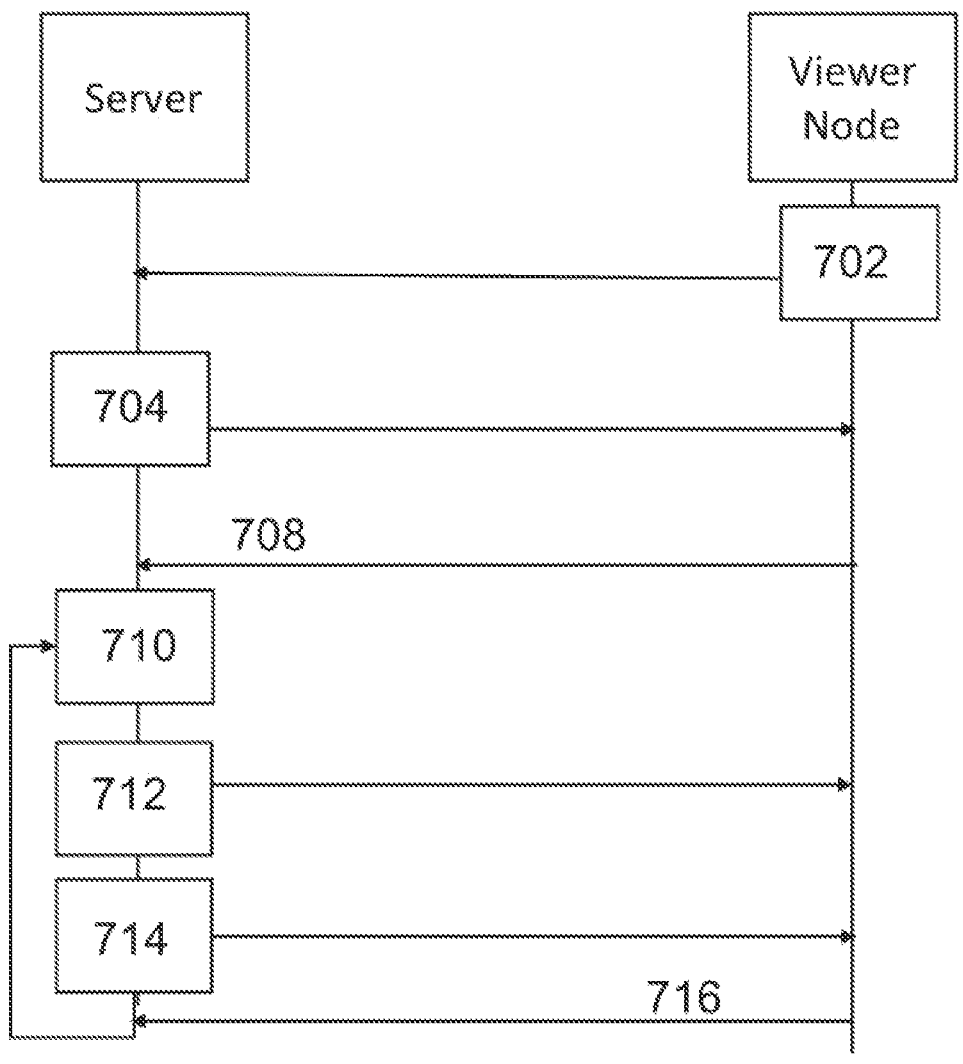
FIG. 7 illustrates an example of a sequence for managing a data flow from a server to viewer nodes in accordance with at least some embodiments.

FIG. 7 illustrates a sequence for managing a data flow from a server to viewer nodes in accordance with at least some embodiments. The sequence is illustrated between the server and one of the viewer nodes. The sequence may be performed in a similar manner between the server and other viewer nodes. It should be noted that in this connection the server is a source node of the host-to-host protocol connection and the viewer nodes are recipient nodes of the host-to-host protocol connection.

Phase 702 comprises the server receiving from one of the viewer nodes, information indicating one or more target parameters. The one or more target parameters may be received included to a request for data frames. Examples of the target parameters are described with phase 602 and comprise at least a target frame rate, size, quality and compression format of the data frames.

Phase 704 comprises adjusting, at the server, one or more target parameters for data frames transmitted to the viewer node on the basis of the received information and transmitting, by the server, data frames to the viewer node on the basis of the adjusted one or more parameters.

Phase 708 comprises receiving, at the data source, from the viewer node, feedback information for the transmitted data frames.

Phase 710 comprises determining, at the server, a connection quality of the transmitted data frames on the basis of the received feedback information. In an example the connection quality may be a success rate of real-time delivery of data frames to the viewer node.

Phases 712 and 714 comprise determining, at the server, whether the connection quality meets a threshold.

Phase 712 comprises, if the connection quality has met the threshold, transmitting data frames to the viewer node without adjusting the one or more parameters.

Phase 714 comprises, if the connection quality has not met the threshold, adjusting the one or more parameters and transmitting data frames to the viewer node on the basis of the adjusted one or more parameters.

Phase 716 comprises receiving, at the server, from the viewer node, feedback information for the transmitted data frames in phase 712 or 714. Then, the sequence may proceed to phase 710 for determining the connection quality anew on the basis of the feedback information received at phase 716. The connection quality may be determined on the basis of a selected feedback information. Accordingly, the feedback information for determining the connection quality may at least comprise the feedback information received for frames that have been transmitted after adjusting the one or more parameters the last time.

In an example in accordance with at least some embodiments, a method for managing data flows between a source node and a plurality of recipient nodes, comprises performing the method in accordance with any of the methods described in connection with FIGS. 2 to 5 for managing data flow between the data source and each of the recipient nodes. In this way data flows to each of the recipient nodes may be managed based on their connection qualities. This is beneficial at least, when data frames are communicated between the source node and the recipient node over heterogenous data links that may be have differences for example capabilities such as capabilities in terms of supported data rates, delay performance and delay variance.

Figures 8, 9:
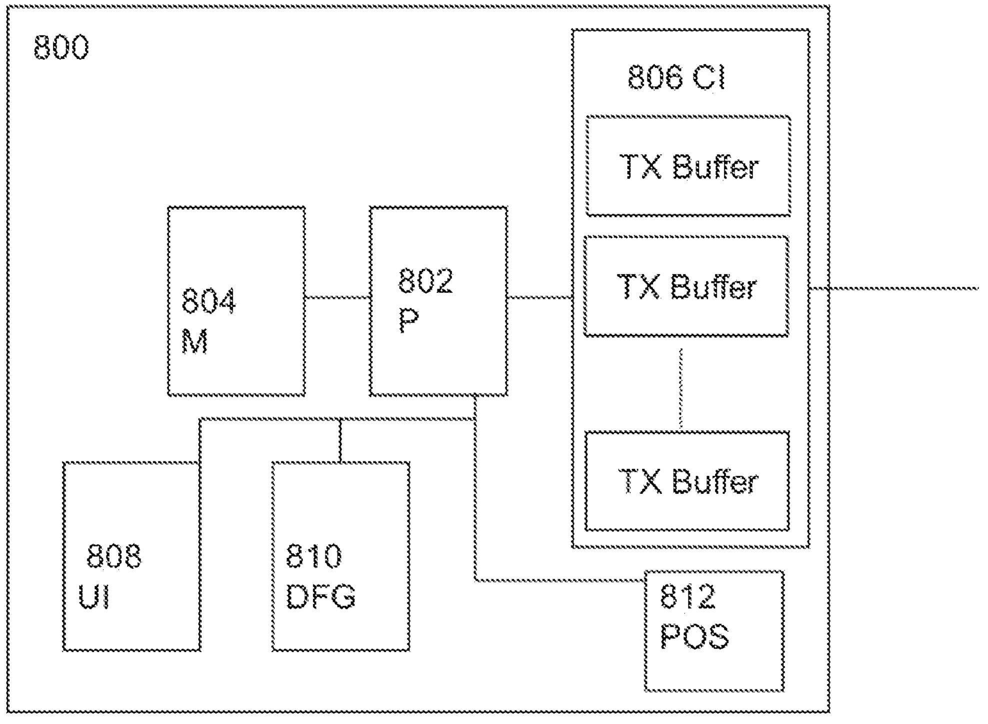
FIG. 8 illustrates an example of an example of an apparatus in accordance with at least some embodiments.
FIG. 9 illustrates an example of a method in accordance with at least some embodiments.

FIG. 8 illustrates an example of an apparatus in accordance with at least some embodiments of the present invention. The apparatus 800 may be a source node or a recipient node.

The apparatus comprises a processor (P) 802 and a communications interface (CI) 806. The processor is operatively connected to the communications interface for controlling the communications interface. The apparatus may comprise a memory (M) 804. The memory may be operatively connected to the processor. It should be appreciated that the memory may be a separate memory or included to the processor and/or the CI. The CI may be a transceiver or connected to a transceiver or at least capable of being connected to a transceiver. The memory may store a computer program computer readable program code means for example computer program code, for execution by the processor. Execution of the computer readable program code means may cause the apparatus performing one or more functionalities described in an embodiment described herein.

Examples of the apparatus 800 comprise a source node, a recipient node, a UE, and a server.

In an example in accordance with at least some embodiments the CI 806 may comprise one or more buffers, e.g. a transmission (TX) buffer. The buffers may be controlled by the processor and/or by the CI to process data frames on the basis of the LIFO method.

In an example in accordance with at least some embodiments the apparatus comprises a Data Frame Generator (DFG) 810, a User Interface (UI) 810 and/or a positioning system (POS) 812. The DFG may be configured to generate data frames. At least one of a frame rate, compression format of the data frames, size of the data frames, quality of the data frames and content of the data frames may be controlled by the processor at least based on target parameters. In an example the, DFG may be configured to generate data frames comprising still images, video and/or positioning data. The DFG may comprise or be connected to a still camera and/or a video camera for obtaining still images and/or video for the data frames. The positioning data may be geographical coordinates, for example global Positioning System (GPS) coordinates. The positioning data may be obtained from the POS. In an example the POS may be a GPS device. The UI may provide output of information to a user and/or input of information to a user. Examples of the information output by the UI comprise data frames that may be displayed to the user. Examples of the input information comprise commands of the user. The UI may comprise a touch screen for both input and output of information. The UI may further comprise an audio output.

According to an embodiment, the processor is configured to control the CI and/or to perform one or more functionalities described according to an embodiment.

An apparatus, for example a server, according to an embodiment may comprise one or more apparatuses 800 for managing data flows between a source node and a plurality of recipient nodes. In this way, a data flow between the server, and each of the recipient nodes may be managed by a dedicated apparatus and connection quality specific to each of the connections may be observed in adjusting data rates over the connections.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

FIG. 9 illustrates a method in accordance with at least some embodiments. The method provides managing a data flow between a source node and a recipient node. The method may be performed by the source node. The method may be performed in connection with at least one of the phases described with FIG. 2 and FIG. 3. The method provides that data frames of a data flow that have not been transmitted to a recipient node in real-time may be delivered to the recipient node for reconstructing the data flow.

Phase 902 comprises determining at least one of an end of data flow and an increased bandwidth to the recipient node.

Phase 904 comprises purging the transmission buffer to the recipient node. It should be noted that the transmission buffer may be purged partially or the whole transmission buffer may be purged. The latter situation may also be referred to flushing the transmission buffer, which may take place, when the end of data flow has been determined. On the other hand purging the transmission buffer partially provides efficient use of the increased bandwidth, and later, when the data flow ends, the less data frames are to be transmitted to the recipient node. Accordingly, purging the transmission buffer should be understood herein as a process of emptying at least partially a transmission queue of data frames in the transmission buffer.

In an example, phase 902 comprises that an increased bandwidth is determined on the basis of receiving feedback information from the recipient node and determining that a time between the reception of the feedback information and a next frame to be stored to the transmission buffer at the target frame rate is higher than a time for transmitting at least one data frame stored to the transmission buffer.

In an example, phase 904 comprises transmitting the data frames from the transmission buffer on the basis of a LIFO method or a First-in-First-out (FIFO) method. The FIFO method may be preferred for facilitating reconstructing the data flow from the beginning of the flow at the recipient node.

Figure 10:
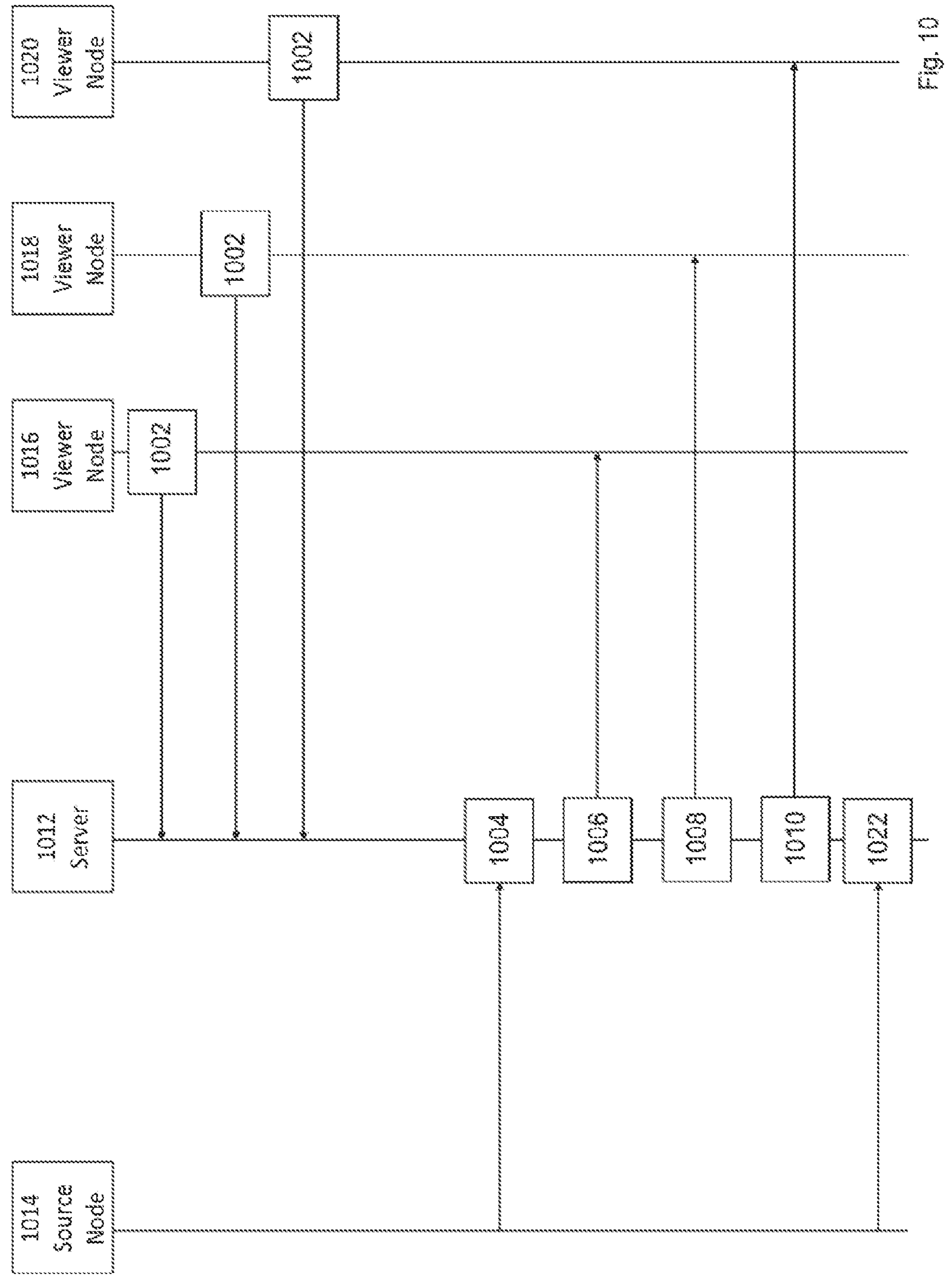
FIG. 10 illustrates an example of managing a data flow from a source node to viewer nodes via a server in accordance with at least some embodiments.

FIG. 10 illustrates managing a data flow from a source node to viewer nodes via a server in accordance with at least some embodiments. A server 1012 may be configured to manage delivery of data frames from one or more source nodes 1014, for example user devices, to one or more viewer nodes 1016, 1018, 1020. A source node 1014 may be connected to the server 1012 over a host-to-host protocol for real-time delivery of data frames from the source node to the server. The server may host buffers, i.e. transmission buffers, for transmitting data frames to each of the viewer nodes and data flows to each of the viewer nodes may be managed in accordance with at least some embodiments described herein, e.g. with phases 202 to 208 in FIG. 2. In this way real-time data delivery to each of the viewer nodes may be supported based on their individual connection qualities.

The viewer nodes 1016, 1018, 1020 may be host-to-host protocol endpoints at the server and/or at user devices. Examples of the viewer nodes at the server comprise at least analytics software applications for machine-based processing the data frames from the source node. Examples of the viewer nodes at the user devices comprise software applications, e.g. audio players, video players, that are operatively connected to one or more user interface devices configured at least for audio and/or video output to user. The software applications may be configured to cause rendering/playing content included to the data frames on the user devices such that the user may consume the content. Since the data frames are delivered in real-time, the viewer nodes have the most recent data frame with a controlled/pre-define quality at their disposal. In this way an up-to-date situational awareness of the viewer nodes and analytics software applications may be supported.

Accordingly, in the scenario illustrated in FIG. 10, data frames may be first delivered from the source node 1014 to the server 1012, whereby the server is a recipient node on the host-to-host protocol connection. The server may deliver the data frames received from the source node to the viewer nodes 1016, 1018, 1020 that have been subscribed for receiving data frames from the source node over a host-to-host protocol. Accordingly, the viewer nodes are recipient nodes and the server node is a source node between the host-to-host protocol connection between the server and the viewer nodes.

Phase 1002 comprises the one or more viewer nodes 1016, 1018, 1020 subscribing to receive data frames from the source node 1014 over a host-to-host protocol connection to the server 1012. Once a viewer node has been subscribed, the server may deliver data frames in real-time to the viewer node provided the server has received any data frames from the source node. It should be noted that communications of data frames between each of the viewer nodes and the server may be arranged in accordance with a method, e.g. the method according to phases 202 to 208 in FIG. 2, described herein for supporting real-time communications of data frames from the server to each of the viewer nodes. It should be noted that the phase 1002 may comprise the viewer nodes subscribing to receive analytics information generated based on the data frames. The data frames and the analytics information may be provided by one or more feeds. Accordingly, the viewer nodes may subscribe to a single feed to receive both the analytics information and the data frames or the data frames, or the viewer nodes may subscribe to one or more feeds that provide the data frames and one or more further feeds that provide the analytics information.

Phase 1004 comprises the server 1012 receiving data frames from the source node. Communications of data frames between the source node and the server may be arranged in accordance with a method, e.g. the method according to phases 202 to 208 in FIG. 2, described herein for supporting real-time communications of data frames from the source node to the server.

Phase 1006, 1008, 1010 comprises the server transmitting data frames to each of the viewer nodes in accordance with a method, e.g. the method according to phases 202 to 208 in FIG. 2, described in at least some embodiments herein for supporting real-time communications of data frames from the server to each of the viewer nodes.

Phase 1022 comprises the server receiving data frames, when the source node 1014 purges its transmission buffer to the server node in accordance with the phases of the method described with FIG. 9.

FIG. 11 illustrates examples of target parameters for viewer nodes. The target parameters for viewer nodes illustrate target parameters for transmission from a source node different types of a recipient nodes, i.e. viewer nodes. Examples of the viewer nodes comprise an audio player software 1102, a video player software 1104 and an analytics software 1106. Each type of the viewer nodes may have respective target parameters 1108, 1119, 1112, 1114 and corresponding ranges. Examples of the target parameters comprise a frame rate 1108, a compression parameter 1110, quality 1112 and compression format 1114. In the illustrated example, the frame rate of the audio player software is defined in milliseconds (ms) within a range from 20 ms to 1000 ms, the quality of the audio player software is defined by sample rate in Hz within a range from 8 kHz to 48 kHz, the compression format is Opus, Advanced Audio Coding (AAC) or MPEG Layer III (MP3). In the illustrated example, the frame rate of the video player software is defined in frames per second (fps) within a range from 1 fps to 30 fps, the quality of the video player software is defined by resolution within a range from 320p to 4 k, the compression format may be Webp, Jpeg, H264 or H265. It should be noted that 4 k refers to refers to a horizontal display resolution of approximately 4,000 pixels. 320*p* refers to 320 horizontal lines of pixels. The compression efficiency parameters for different viewer nodes refers to a quality setting of an encoding algorithm. In the illustrated example, the frame rate of the analytics software has scalable frame rate requirements, the compression parameter is static, the quality of the analytics software is static and the compression format may be any. It should be noted that the frame rate 1108 and quality 1112 may be adjusted in steps within the given ranges for each of the examples of the viewer nodes and the compression format may be selected to be any of the options for compression format for each of the examples of the viewer nodes. It should be noted that FIG. 11 illustrates only some examples and in practice the ranges, options and values of the parameters may be different.

In an example in accordance with at least some examples, adjusting one or more of the target parameters may comprise adjusting the target parameters within a given range of the parameter. The parameters may be adjusted in steps within the given range. The given ranges may be specific to viewer nodes according to the example of FIG. 11. The adjusting may be performed on the basis of a connection quality, for example if the connection quality has not met the threshold. In an example, the compression and a frame rate of data frames transmitted to the recipient node may be adjusted on the basis of a frame quality and size. The frame quality and size may indicate the quality 1112.

In an example, a connection quality may be measured as described with phase 204 in FIG. 2. If the connection quality has not met a threshold, the target parameters may be adjusted in accordance with phase 714. When the connection quality has not met the threshold, the connection quality may be considered insufficient. When the connection quality is insufficient, transmission errors of data frames may be increased, which may prevent successful reception of the data frames and a data rate supported by a connection for transmission of the data frames may be low. Therefore, real-time communications of data frames with sufficient quality from a source to a recipient is challenging or may be prevented. Adjusting the target parameters supports real-time communications of data frames from the source node to the recipient node. In an example, if the connection quality has not met the threshold, e.g. a success rate, one or more of the target parameters may be changed. To facilitate meeting the threshold, the frame rate may be decreased and/or the quality may be decreased. The target parameters may be arranged in have predefined combinations of target parameters values that may be selected, when the target parameters are changed. Examples of the combinations comprise at least combinations of frame rate, quality and compression format.

FIG. 12 illustrates a method in accordance in accordance with at least some embodiments. The method provides generating mission-specific analytics information based on mission time accurate data frames in a manner that supports up-to-date situational awareness. The method may be performed by the recipient node or a computerized service platform configured to implement functionalities of both a source node and the recipient node, or a viewer node, in accordance to FIG. 1. The mission time accurate data frames may refer to data frames received from a source node in various examples described herein. The mission time accurate data frames may be generated by the source nodes by LIFO queuing as described above.

Phase 1202 comprises receiving, at the recipient node connected to one or more source nodes over a data connection, mission time accurate data frames from the one or more source nodes.

Phase 1204 comprises assigning, at the recipient node, each of the one or more source nodes to one or more missions.

Phase 1206 comprises assigning, at the recipient node, one or more analytics recipes to each of the one or more missions, for generating mission-specific analytics information based on mission time accurate data frames received from one or more source nodes assigned to each of the one or more missions.

Phase 1208 comprises generating at the recipient node, processing jobs for processing the mission time accurate data frames received from one or more source nodes assigned to specific missions, wherein the processing jobs are assigned to recipe-specific processing queues of the one or more analytics recipes assigned to the specific missions. Since the mission time accurate data frames are processed using the processing jobs that are queued at recipe-specific processing queues, the processing load of each of the recipes may be managed.

In an example, phase 1208 comprises that the mission time accurate data frames may be processed by at least two recipes, 'A' and 'B', that are assigned to one or more missions. Then, a rule may be defined for each mission to process mission time accurate data frames from source nodes assigned to the mission by the recipe 'A' and 'B'. In an example the rule for each mission may define which recipes of all available recipes, in this case 'A' and 'B', are used for processing the mission time accurate data frames and reliability levels that are applied to each of the recipes. Accordingly, one or more a processing parameters, examples of which comprise at least a reliability level, may be defined for each recipe. It should be noted that the source nodes assigned to each mission may be the same or at least partially the same or each mission may be assigned different source nodes. Accordingly, each mission may be assigned one, two, three or a higher number of source nodes and the number of source nodes between missions may be the same or different. Each source node may generate and transmit the mission time accurate data frames based on one or more target parameters, whereby processing load to each recipe may be dependent on at least one of the target parameters of each source node, a number of source nodes assigned to the mission, a mission-specific reliability level and a number of missions the recipe has been assigned to.

In an example in accordance with at least some embodiments, phase 1208 comprises that the processing jobs are generated at a rate that is smaller than a rate of the mission time accurate data frames received from one or more source nodes assigned to a specific mission. In this way a load caused by the processing jobs from one mission may be controlled, whereby processing jobs from one or more other missions may be processed by the recipe. It should be noted that the rate of the mission time accurate data frames received from one or more source nodes assigned to a specific mission may refer to a rate of the mission time accurate data frames received from an individual source node.

In an example in accordance with at least some embodiments, phase 1208 comprises that the processing jobs are assigned to recipe-specific processing queues based on recipe-specific rates $F:R_i$, where $R_i$ is an integer number specific to a recipe and the specific mission, and smaller than F, and F is a rate of mission time accurate data frames received from one or more source nodes assigned to the specific mission served by the recipe. In this way the processing jobs may be assigned based on the recipe-specific rates, $F:R_i$. The $F:R_i$ may be determined based on processing resources of each recipe. It should be noted that the $R_i$, and thus also $F:R_i$, may be specific to a mission. The F and $R_i$ are specific for a time interval that may be chosen according to implementation. However, each recipe may be assigned to more than one missions, thus a plurality of missions, whereby a total processing load to each recipe is also dependent on the number of missions served by the recipe and the rate of mission time accurate data frames received from one or more source nodes assigned to each specific mission. The mission-specific $F:R_i$ may be adapted by a processing load caused by the processing job, when the recipe processes the mission time accurate data frames of the processing job to meet a defined reliability level. Accordingly, if the reliability level defined for the recipe is high, the processing job causes a high load to the recipe and the recipe-specific rate may be $F:R_{imh}$, where $R_{imh}$ is an integer number specific to the recipe and smaller than F. On the other hand if the reliability level is low, the processing job cause a low load to the recipe and the recipe-specific rate may be $F:R_{iml}$, where $R_{iml}$ is an integer number specific to the recipe and smaller than F. Then, $R_{iml}>R_{iml}$.

In an example in accordance with at least some embodiments, phase 1208 comprises that the recipe-specific rates $F:R_i$ are adapted based on at least one of a number of missions served by a given recipe, a highest rate of mission time accurate data frames received by a mission served by a given recipe, a lowest rate of mission time accurate data frames received by a mission served by a given recipe and a processing load caused by the processing job. In an example, if a number of missions served by a recipe meets a threshold number of missions, e.g. the number of missions served by the recipe is higher than the threshold number of missions, the recipe specific rate $F:R_i$ may be decreased, for example $F:R_i$ may be adapted to $F:R_{iUpperlimit}$, where $R_i>R_{iUpperlimit}$, and $R_{iUpperlimit}$ is an upper limit for the $R_i$. In an example, if a number of missions served by a recipe meets a threshold number of missions, e.g. the number of missions served by the recipe is lower than the threshold number of missions, the recipe specific rate $F:R_i$ may be increased, for example $F:R_i$ may be adapted to $F:R_{iLowerlimit}$, where $R_i<R_{iLowerlimit}$ and $R_{iLowerlimit}$ is an lower limit for the $R_i$. In an example, more than one of the number of missions served by a given recipe, the highest rate of mission time accurate data frames received by a mission served by a given recipe, the lowest rate of mission time accurate data frames received by a mission served by a given recipe and the processing load caused by the processing job may be used for adapting the recipe-specific rates $F:R_i$. In an example, the recipe specific rate $F:R_i$ may be adapted, e.g. increased or decreased, based on a number of missions served by a recipe meets a threshold number of missions and a load caused by a processing job when the recipe processes the mission time accurate data frames of the processing job to meet a defined reliability level. Table 1 illustrates examples of adaptation criteria and corresponding adaptation decisions and actions.

TABLE 1

| Adaptation criterion | Adaptation criterion | Adaptation decision/action |
|---|---|---|
| No. of missions served by recipe | Processing load caused to recipe | Adaptation of Recipe-specific rates F:Ri |
| Higher than threshold number of missions | High | Decrease Ri |
| Lower than threshold number of missions | Low | Increase Ri |
| Higher than threshold number of missions | Low | No adaptation or evaluation of one or more further criteria for deciding on the adaptation |
| Lower than threshold number of missions | High | No adaptation or evaluation of one or more further criteria for deciding on the adaptation |

In an example in accordance with at least some embodiments, phase 1208 comprises providing, at the recipient node, at least one user interface component for generating mission dashboards for a plurality of users based on the generated mission-specific analytics information and for receiving user input. A mission dashboard may comprise analytics information generated by one or more recipes assigned. The dashboard may further comprise one or more user interface elements for assigning one or more source nodes to missions based on user interaction on the one or more user interface elements. The dashboard may further comprise one or more user interface elements for assigning one or more recipes to missions based on user interaction on the one or more user interface elements.

In an example in accordance with at least some embodiments, phase 1206 comprises that the one or more analytics recipes are assigned to each of the one or more missions based on rules. Each mission may have its own rule, i.e. a mission-specific rule. In this way a rule may control which recipes are assigned to each mission and for processing mission time accurate data frames from data source assigned to the mission. In an example a rule may be defined by a user via a user interface based on selecting one or more recipes to a given mission. The user interface may be provided by a user interface component e.g. on a mission dashboard.

Figure 13:
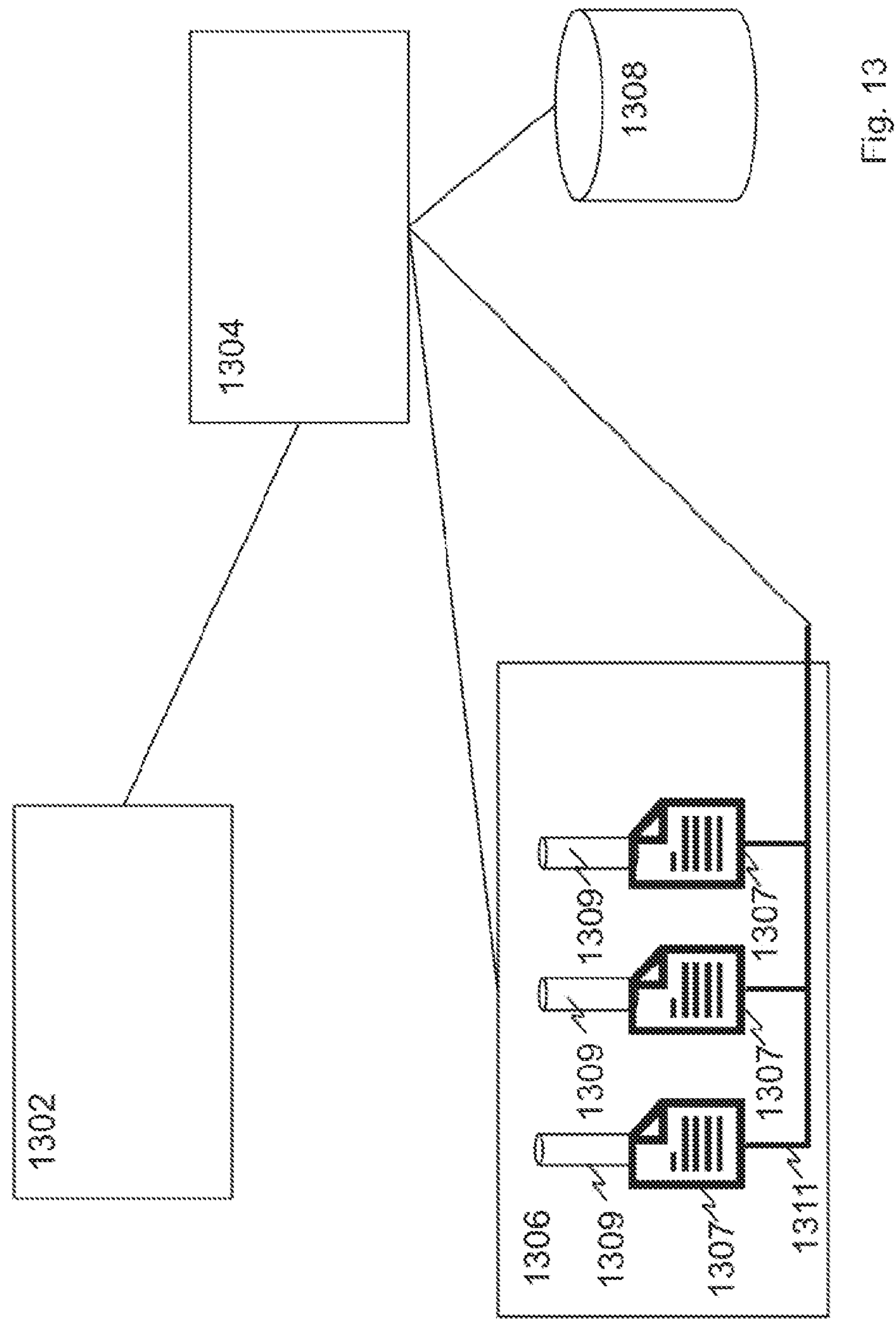
FIG. 13 illustrates an example of a software architecture for monitoring missions in accordance with at least some embodiments.

FIG. 13 illustrates a software architecture for monitoring missions in accordance with at least some embodiments. The software architecture may be implemented at computerized service platform configured to implement functionalities of both a source node and a viewer node in accordance to FIG. 1. Implementation of the computerized service platform may follow the example of an apparatus described with FIG. 8.

The software architecture may comprise a backend 1302, an analytics tasker 1304, an analytics bus 1306 and an analytics database 1308 that are operatively interconnected for communications of data frames, analytics information and notifications. The software architecture supports up-to-date situational awareness in a mission by the analytics tasker generating processing jobs to the analytics bus for processing data frames from one or more source nodes assigned to the mission and the analytics tasker delivering mission-specific analytics information from the analytics bus to the backend. The data frames may be mission time accurate data frames generated by source nodes e.g. as described with FIG. 2.

The backend 1302 may be a node of a communications system that is configured to implement functionalities of both a source node and a viewer node. The backend may be connected to one or more source nodes and one or more viewer nodes. The backend may be configured to perform one or more functionalities of a viewer node, when the backend receives data frames from the one or more source nodes and the backend may be configured to perform one or more functionalities of a source node, when the backend provides data frames to the one or more viewer nodes of a mission. The analytics tasker provides mission-specific analytics information to the backend, whereby the backend may provide the mission-specific analytics information to the one or more viewer nodes in addition to the data frames.

In an example in accordance with at least some examples, the backend 1302 may be configured to deliver mission time accurate data frames and mission-specific analytics information generated based on the mission time accurate data frames to one or more recipient nodes. In an example, the backend may be a recipient node for the mission time accurate data frames and deliver the mission-specific analytics information to one or more further recipient nodes, also referred to as viewer nodes. In an example, the backend 1302 may comprise a bus for real-time distribution of mission time accurate data frames and analytics information from the one or more source nodes connected to the backend to the one or more viewer nodes connected to the backend. In this way the backend may support up-to-date situational awareness of the viewer nodes. In an example, the mission time accurate data frames and analytics information may be provided at the analytics bus by feeds. Accordingly, the feeds may at least comprise a feed of mission-specific data frames, or content, and a feed of mission-specific analytics information. Since the data frames and analytics information are provided as feeds, the data frames and analytics information may be delivered to viewer nodes based on subscriptions of the viewer nodes to the feeds in accordance to an example described with FIG. 11. On reception, at the one or more viewer nodes, of a notification of new data at the feeds, e.g. one or more new data frames and/or new analytics information, the notified viewer nodes may retrieve the new data from the analytics bus. It should be noted the feed of mission-specific data frames may be also subscribed by one or more components of the software architecture, e.g. the analytics tasker 1304, for delivering the data frames from the backend to the one or more components.

In an example, the backend 1302 may provide the mission time accurate data frames and analytics information in a single feed, i.e. a combined feed, or the mission time accurate data frames and analytics information are each provided separately in one or more feeds. When providing the combined feed, the data frames and the analytics information may be synchronized. Therefore, the combined feed comprises the data frames and analytics information generated based on the data frames. In this way the situational awareness provided by the analytics information conforms to the data frames. When the mission time accurate data frames and analytics information are provided in separate feeds, processing of the data frames by recipes does not cause delay to the data frames. Load of each recipe may be controlled in order to maintain a delay between the data frames and analytics information generated based on the data frames at acceptable level for supporting up-to-date situational awareness.

In an example, the analytics tasker 1304 may be configured to generate processing jobs for processing the data frames received at the backend 1302 from the one or more source nodes by one or more analytics recipes 1307, or in short, recipes, assigned to specific missions. The processing jobs may be generated to the analytics bus 1306 comprising recipe-specific processing queues 1309 and corresponding recipes 1307. The recipes provide generating mission-specific analytics information. It should be noted that each source node may be assigned to one or more missions, whereby data frames received from each source node may be processed by one or more of the recipes. Each mission may have a mission-specific rule for generating analytics information. The mission-specific rule may determine the one or more recipes that are used to process data frames received from the one or more source nodes assigned to the mission. Additionally, the mission-specific rule may determine one or more input parameters for the one or more recipes. Examples of the input parameters comprise at least reliability levels that may be applied to the recipes. Each recipe may have its own input parameters.

In an example in accordance with at least some embodiments, the analytics bus may comprise recipes 1307 and recipe-specific processing queues 1309, one for each recipe. In this way processing jobs for generating mission-specific analytics information may be queued at recipe-specific processing queues. Since queuing of the processing jobs of different recipes may be separated from another, processing load of each of the recipes may be controlled individually based on statuses of the recipe-specific queues. The control may be implemented for example at the analytics tasker based on the recipe-specific rates, $F{:}R_i$, at which processing jobs are assigned to recipe-specific processing queues. The processing jobs may be generated by the analytics tasker 1304 and assigned to the recipe-specific processing queues at the analytics bus 1306.

In an example of controlling a processing load of a recipe, if a number of processing jobs queued in a recipe-specific queue 1309 is high, a recipe-specific rate at which the analytics tasker is configured to assign processing jobs to the recipe-specific processing queue may be decreased. On the other hand, if a number of processing jobs queued in a recipe-specific queue is low a recipe-specific rate at which the analytics tasker is configured to assign processing jobs to the recipe-specific processing queue may be increased. It should be noted that alternatively or additionally to the number of processing jobs, loads of processing jobs at the recipe-specific queues may be determined for controlling processing loads of the recipes.

A load of a processing job may be determined based on one or more input parameters to the mission. The input parameters may be specific to each mission. Examples of the input parameters comprise, e.g. an, e.g. a reliability level, of a recipe. Since a recipe-specific processing queue may comprise processing jobs from a plurality of missions, a total load of the processing jobs at the recipe-specific queue for each recipe at a given moment may be determined based on loads of the processing jobs. A load of a processing job may be determined based on one or more input parameters, e.g. a reliability level, to the mission.

In an example in accordance with at least some embodiments, the analytics tasker 1304 may assign the generated processing jobs to one or more recipe-specific queues 1309. In this way the processing jobs processed by each recipe may be managed individually, whereby recipe-specific load control is facilitated. Accordingly, the analytics tasker may determine based on one or more mission-specific rules which recipe(s) should be used for processing received data frames from source nodes assigned to a given mission. In an example, the analytics tasker 1304 may subscribe, or register, to follow one or more feeds provided at the backend 1302. In this way data frames may be delivered to the analytics tasker based on its subscription from the bus at the backend. Accordingly, on reception of a notification, at the analytics tasker 1304, indicating one or more available new data frames at the feeds from the backend, the analytics tasker may retrieve data frames from the bus and generate processing jobs according to mission-specific rules. The data frames include information identifying source nodes of the data frames which enables determining which rules should be followed for processing the data frames.

The analytics bus 1306 may comprise a common output feed 1311 or recipe-specific output feeds for communications of the analytics information generated by the recipes to the analytics tasker 1034.

In an example in accordance with at least some embodiments, the analytics tasker 1304 may generate processing jobs at recipe-specific rates, $F:R_i$, for each mission, where F is a rate of mission time accurate data frames received from one or more source nodes assigned to a specific mission served by the recipe and $R_i$ is an integer number specific to the recipe and the mission, and smaller than F. In this way recipe-specific load control may be supported. Since each recipe may be used to process data frames for a plurality of missions, a total load of each recipe may be controlled based on the recipe-specific rates, $F:R_i$ of the missions. At a given moment, a load of the processing jobs at the recipe-specific queue may be determined based on loads of the processing jobs at the queue. A load of a processing job may be determined based on one or more input parameters, e.g. a reliability level, to the mission.

In an example, the analytics information generated by the recipes may be provided from the analytics bus 1306 to the analytics tasker 1304 based on feeds. Accordingly, the analytics bus 1306 may send a notification indicating that new analytics information is available to the analytics tasker and, the analytics tasker, in response to receiving the notification, may retrieve the new analytics information from the analytics bus. The analytics tasker 1304 may be configured to subscribe, or register at the analytics bus, to follow the one or more feeds provided at the analytics bus 1306.

The analytics tasker 1308 may be configured to store the generated analytics information to the analytics database.

Figure 14:
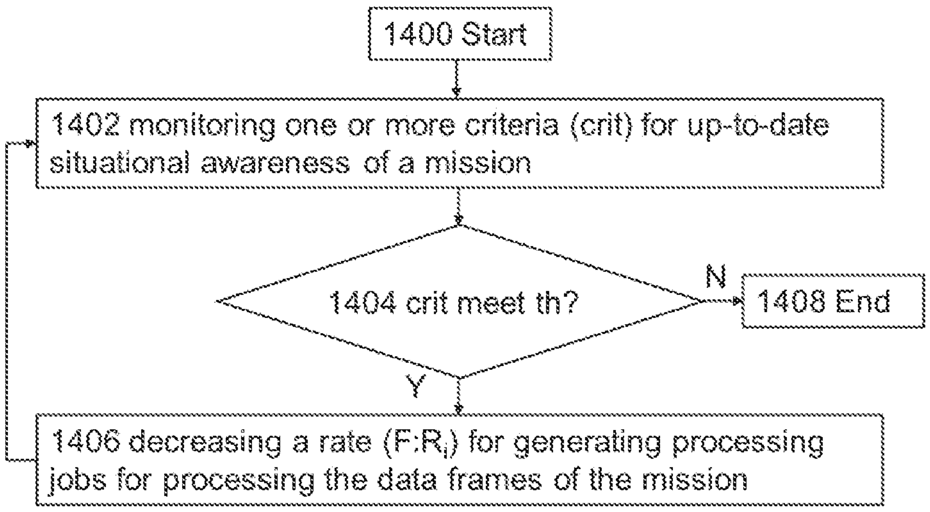
FIG. 14 illustrates an example of a method in accordance with at least some embodiments.

FIG. 14 illustrates a method in accordance with at least some embodiments. The method provides generating mission-specific analytics information based on mission time accurate data frames in a manner that supports up-to-date situational awareness. The method may be performed in connection with phase 1308 of FIG. 13 at the computerized service platform. The mission time accurate data frames may be generated by source nodes e.g. as described with FIG. 2. The method may start at 1400, where mission-specific analytics information is available. Since the mission-specific analytics information is generated based on one or more data frames communicated in real-time from the source nodes, the situational awareness provided by the mission-specific analytics information together with the data frames may be evaluated and if needed, a necessary action may be taken to improve the situational awareness of the mission. The mission-specific analytics information may be generated by one or more recipes based on processing jobs generated in phase 1208 of FIG. 12.

Phase 1402 comprises monitoring one or more criteria (crit) for up-to-date situational awareness of the mission. In an example, the one or more criteria may comprise at least a criterion indicating a mismatch between a timing of the mission-specific analytics information and the data frames of the mission. The timing and more precisely the mismatch of the timing is important for the situational awareness, since the sooner the mission-specific analytics information for a data frame comprising an event in the mission is ready, the more accurate support for the situational awareness can be provided. Accordingly, the monitoring provides that the situational awareness provided by the data frames and mission-specific analytics information may be determined to meet, or not to meet, at least one of the criteria. An example of the criteria is a delay, $\Delta T$, between a latest data frame received from a data source assigned to the mission and a time at which the mission-specific analytics information based on the latest data frame received from the data source assigned to the mission has been generated. The delay may be measured e.g. based on a time instant, $T_{frame}$, at which the latest data frame received from a data source assigned to the mission is available to be delivered to viewer nodes and a time instant, $T_{frameanalytics}$, at which the mission-specific analytics information generated based on the latest data frame is available to be delivered to viewer nodes. Accordingly, the delay, or a time difference, $\Delta T = T_{frameanalytics} - T_{frame}$, may be a criterion, crit, monitored for up-to-date situational awareness of the mission. The time instants may be measured e.g. from the bus at the backend 1302, where both the data frames and generated analytics information are provided as described with FIG. 13.

Phase 1404 may comprise evaluating the determined one or more criteria meeting a corresponding threshold (th). Accordingly, each criterion may have its own threshold. In an example, the delay, $\Delta T = T_{frameanalytics} - T_{frame}$, may be evaluated based on the threshold value for the delay. The delay $\Delta T = T_{frameanalytics} - T_{frame}$ may be caused by processing data frames of the mission by one or more recipes for generating the analytics information of the mission, whereby the threshold value for the delay may be set based on an acceptable delay for processing data frames of the mission. It should be noted that since the recipes process data frames based on mission-specific rules, a processing load of each recipe is dependent on the loads caused by each mission that the recipe has been assigned to. If at least one of the monitored criteria meet a corresponding threshold in phase 1404, a need to adjust a load of recipe(s) assigned to the mission may be determined and method may proceed to phase 1406. If the monitored criteria have not been met, the method may proceed to phase 1408, where the method may end. It should be noted that the method may also be performed continuously, whereby after phase 1404, the method may proceed to phase 1402.

Phase 1406 may comprise adapting a recipe-specific rate, F:$R_i$, for generating processing jobs for processing the data frames of the mission. In this way the rate may be adapted based on the criteria. In an example, phase 1406 comprises decreasing the rate for generating processing jobs for processing the data frames of the mission. Since the rate is decreased, less processing jobs are generated to recipe-specific queues, whereby a queuing delay to the recipe may be reduced. In this way the mission-specific analytics information generated based on the latest data frame may be made been available to be delivered to viewer nodes more quickly. It should be noted that the F:$R_i$ is a rate at which the processing jobs are generated for processing the data frames from a specific mission utilizing the recipe. The method may proceed from phase 1406 to phase 1402, where monitoring of the criteria may be continued. In an example, the phase 1402 may comprise receiving one or more further data frames from the data source assigned to the mission and determining a further delay between a latest data frame received from a data source assigned to the mission and a time at which the mission-specific analytics information based on the latest data frame received from a data source assigned to the mission has been generated.

Figure 15:
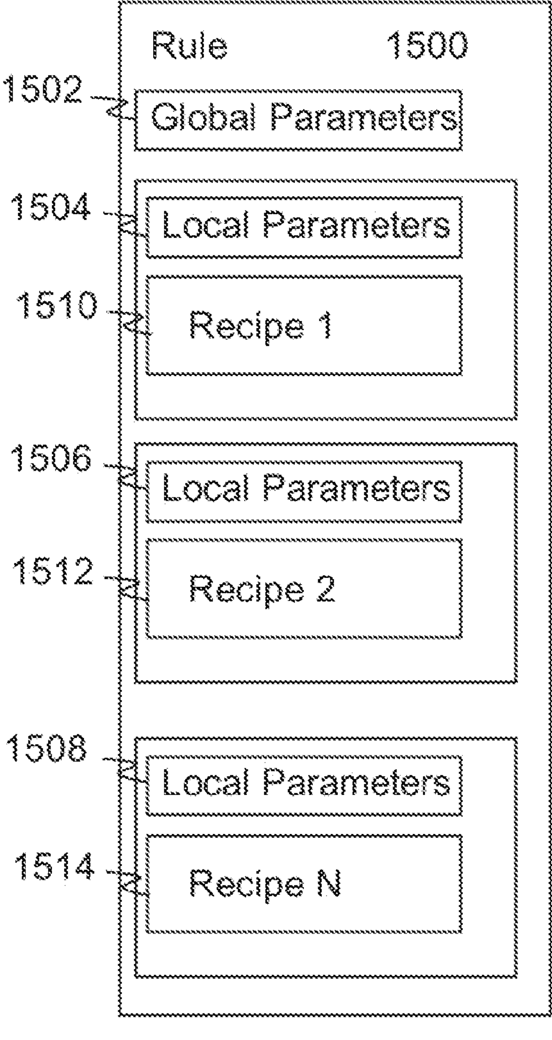
FIG. 15 illustrates an example of a rule in accordance with at least some embodiments.

FIG. 15 illustrates an example of a rule in accordance with at least some embodiments. The rule 1500 may comprise one or more parameters 1502, 1504, 1506, 1508 for controlling execution of one or more recipes 1510, 1512, 1514. The one or more recipes may be used to process data frames, or mission time accurate data frames, received from one or more source nodes assigned to the mission. The one or more parameters may be at least one of global parameters 1502 and local parameters 1504, 1506, 1508. The global parameters apply to all recipes. The local parameters apply only to a portion of all recipes. In an example, the local parameters may apply to a single recipe, whereby they are recipe-specific parameters.

In accordance with at least embodiments, examples of the one or more parameters comprise: information identifying a source node, information identifying a source application at a source node, sampling time interval ($T_{SR}$), reliability level, reliability filtering on/off, target filtering on/off, alert targets, type of pre-processing for mission time accurate data frames and an operation mode.

In an example, the sampling time interval ($T_{SR}$) may be a target rate at which a recipe 1510, 1512, 1514 is allocated mission-time accurate data frames to be processed by the recipe. The target rate may control the $R_i$ or be the $R_i$.

In an example, the reliability level may determine a reference output against which an output of a recipe 1510, 1512, 1514 may be compared with, whereby a reliability of the recipe's output may be determined. The reliability level may be used to control use, e.g. delivery, of the output of the recipe to viewer nodes, e.g. via feeds of the analytics bus.

In an example, the reliability filtering on/off may control whether mission-specific analytics information is filtered based on a reliability level. In an example, if mission-specific analytics information from a recipe 1510, 1512, 1514 does not meet a reliability level and the reliability filtering is on, the mission-specific analytics information is filtered out and the mission-specific analytics information is not delivered to viewer nodes.

In an example, the target filtering on/off, may control whether mission-specific analytics information generated by a recipe 1510, 1512, 1514 is filtered based on detection results of the recipe. If the target filtering is on, object detection results may be filtered such that only a part of the objection detection results generated by the recipe may be delivered to viewer nodes. The filtering of the objection detection results may be performed based on defining one or more types of objects as objects of interest, whereby the viewer nodes are delivered only the mission-specific analytics information comprising detection results of the objects of interest.

In an example the alert targets may define one or more viewer nodes and/or one or more components of software architecture that have been subscribed, e.g. to a feed, to receive mission-specific analytics information generated by a recipe 1510, 1512, 1514.

In an example, the type of pre-processing for mission-time accurate data frames may comprise controlling lighting, controlling expose, motion correction, resolution adaptation and normalizing data. The pre-processing may be performed according to a type of the mission time accurate data frames, for example image data frames or video data frames. The pre-processing may be performed before the mission-time accurate data frames are processed by a recipe 1510, 1512, 1514.

In an example, the operation mode may define an operation mode for a recipe 1510, 1512, 1514. The operation mode may control e.g. whether mission time accurate data frames are processed continuously by the recipe or if the processing is performed until a predetermined criterion has been satisfied.

In an example, the predetermined criterion may be that a recipe 1510, 1512, 1514 has generated mission-specific analytics information indicating a detection of a predetermined number of objects and/or that the recipe has generated mission-specific analytics information indicating a detection of a predetermined type of objects.

Figure 16:
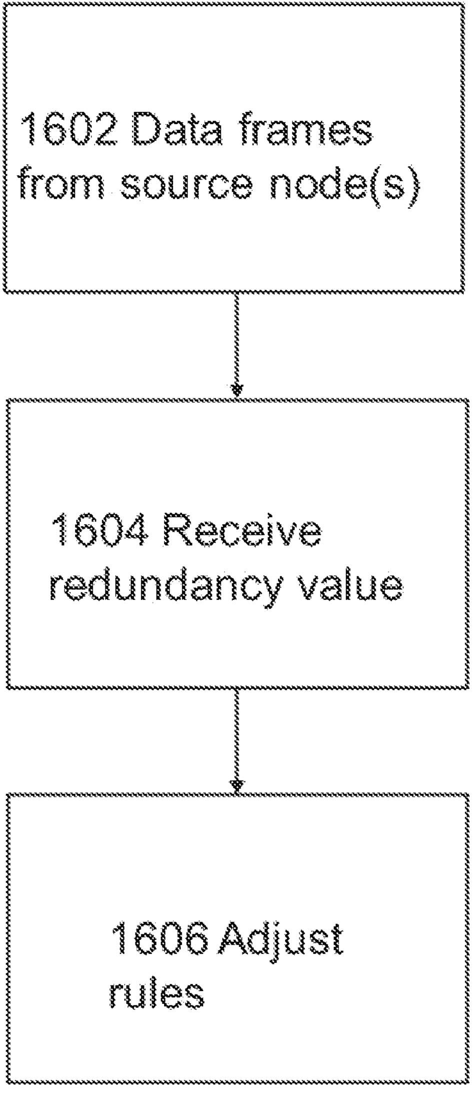
FIG. 16 illustrates an example of a method for controlling a rule in accordance with at least some embodiments.

FIG. 16 illustrates an example of a method for controlling a rule in accordance with at least some embodiments. The rule may comprise one or more parameters in accordance to described with FIG. 15 and the one or more parameters may be controlled based on one or more redundancy values received from source node(s) assigned to a mission. The method may be performed at a recipient node or a computerized service platform configured to implement functionalities of both a source node and the recipient node, or a viewer node, in accordance to FIG. 1.

Phase 1602 comprises receiving mission time accurate data frames from one or more source nodes in accordance to described with phase 1202 of FIG. 12.

Phase 1604 comprises receiving a redundancy value from at least one of the one or more source nodes. In an example, the redundancy value comprises information indicating redundancy characteristics of mission time accurate data frames generated by the at least one source node. The redundancy characteristics may comprise a floating-point value from 0 to 1. The lowest value of the redundancy characteristics, e.g. 0, may indicate that the mission time accurate data frames from the at least one source node are highly non-redundant. In an example, correlation between subsequent mission time accurate data frames is low. The highest value of the redundancy characteristics, e.g. 1, may indicate that the mission time accurate data frames from the at least one source node are highly redundant. In an example, correlation between subsequent mission time accurate data frames is high and the subsequent mission time accurate data frames may be even the same.

Phase 1606 comprises adjusting the at least one rule based on the received redundancy value. The phase 1606 may be performed based on determining a need to adjust the at least one rule based on the received redundancy value. In an example the need may be determined based on determining that the received redundancy value is high or low. The redundancy value may be determined to be high or low based on a history or redundancy values received from the at least one source node and/or a threshold value setting. The threshold value setting may comprise a single value or more than one value. An example of the threshold value setting comprising more than one value is that the threshold value setting may comprise a lower threshold value for determining a low redundancy value and a high threshold value for determining a high redundancy value. In an example, a sampling time interval ($T_{SR}$) or $R_i$ of the rule may be adjusted based on the received redundancy value. For example, if the received redundancy value indicates that the mission time accurate data frames from the at least one source node are highly non-redundant, e.g. the received redundancy value meets the low threshold, the sampling time interval ($T_{SR}$) or $R_i$ may be increased. For example, if the received redundancy value indicates that the mission time accurate data frames from the at least one source node are highly redundant, e.g. the received redundancy value meets the high threshold, the sampling time interval ($T_{SR}$) or $R_i$ may be decreased. For example, when the received redundancy value is 1, the sampling time interval ($T_{SR}$) or $R_i$ may be set to 0. In this way the redundancy value may be used to control the rule and processing of the mission time accurate data frames by recipe(s).

In an example in accordance with at least some embodiments, phase 1606 may comprise determining which recipes are receiving, or have been configured to receive, mission time accurate data frames from the at least one source node and adjusting rules for controlling the determined recipes. In an example phase 1606 may comprise determining which recipes controlled by the rule are used for processing mission time accurate data frames from the at least one source node and adjusting one or more local parameters of the recipes that are used for processing mission time accurate data frames from the at least one source node. In this way local parameters of recipes that are not used processing mission time accurate data frames from the at least one source node may be maintained, whereby mission-specific analytics information may be generated for the mission based on mission time accurate data frames that are not received for the at least source node that originated the redundancy value.

An embodiment concerns a computer program comprising instructions which, when the program is executed by a computer, cause the computer to carry out a method described in one or more examples described herein. Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A system comprising at least one processing core, at least one memory including computer program code, the at least one memory and the computer program code being configured to, with the at least one processing core, cause the system at least to:

a. receive, at a recipient node connected to a plurality of source nodes over a data connection, mission time accurate data frames from the plurality of source nodes;

b. assign, at the recipient node, each of the plurality of source nodes to a plurality of missions;

c. assign, at the recipient node, a respective analytics recipe to each of the missions, for generating mission-specific analytics information based on the mission time accurate data frames received from the plurality of source nodes assigned to the missions, wherein the mission-specific analytics information is generated based on mission specific rules defining a plurality of input parameters including a mission-specific reliability level associated with each respective analytics recipe; and d. generate, at the recipient node, processing jobs for processing the mission time accurate data frames received from the plurality of source nodes assigned to specific missions, wherein the processing jobs are assigned to recipe-specific processing queues of the analytics recipes assigned to the specific missions by adapting a recipe-specific rate for generating the processing jobs based on the plurality of input parameters and available recipe processing resources.

2. The system according to claim 1, wherein the processing jobs are generated at a rate that is smaller than a rate of the mission time accurate data frames received from plurality of source nodes assigned to a specific mission.

3. The system according to claim 2, wherein the processing jobs are assigned to the recipe-specific processing queues based on recipe-specific rates F: $R_i$, where $R_i$ is an integer number specific to a recipe and the mission, and smaller than is a rate of mission time accurate data frames received from plurality of source nodes assigned to the specific mission served by the recipe.

4. The system according to claim 3, wherein the recipe-specific rates F:$R_i$ are adapted based on at least one of a number of missions served by a given recipe, a highest a rate of mission time accurate data frames received by a mission served by a given recipe and a lowest rate of mission time accurate data frames received by a mission served by a given recipe.

5. The system according to claim 1, caused to:

e. provide, at the recipient node, at least one user interface component for generating mission dashboards for a plurality of users based on the generated mission-specific analytics information and for receiving user input.

6. The system according to claim 1, caused to:

deliver mission time accurate data frames and the generated mission-specific analytics information to one or more further recipient nodes.

7. The system according to claim 1, wherein the analytics recipes are assigned to each of the missions based on rules for controlling execution of the analytics recipes.

8. The system according to claim 1, caused to:

receive, at the recipient node, a redundancy value from at least one of the source nodes;

adjusting, at the recipient node, at least one rule for controlling execution of the analytics recipes based on the received redundancy value.

9. The system according to claim 1, caused to:

determine which analytics recipes have been configured to receive mission time accurate data frames from the at least one source node; and adjust rules for controlling the determined analytics recipes.

10. The system according to claim 1, wherein the system is caused to:

f. store, at the plurality of source nodes, mission time accurate data frames into buffers for transmission to the recipient node over a host-to-host protocol connection;

g. measure, at the plurality of source nodes, a connection quality of the host-to-host protocol connection;

h. adjust, at the plurality of source nodes, one or more target parameters of the transmission on the basis of the measured connection quality;

i. transmit, by the plurality of source nodes, data frames from the buffer to the recipient node on the basis of a Last-In, First-Out (LIFO) method and the adjusted one or more target parameters.

11. A method comprising:

j. receiving, at a recipient node connected to a plurality of source nodes over a data connection, mission time accurate data frames from the plurality of source nodes;

k. assigning, at the recipient node, each of the source nodes to a plurality of missions;

l. assigning, at the recipient node, analytics recipes to each of the missions, for generating mission-specific analytics information based on mission time accurate data frames received from the plurality of source nodes assigned to each of the missions, wherein the mission-specific analytics information is generated based on mission specific rules defining a plurality of input parameters including a mission-specific reliability level associated with each respective analytics recipe; and m. generating, at the recipient node, processing jobs for processing the mission time accurate data frames received from source nodes assigned to specific missions, wherein the processing jobs are assigned to recipe-specific processing queues of the analytics recipes assigned to the specific mission by adapting a recipe-specific rate for generating the processing jobs based on the one plurality of input parameters and available recipe processing resources.

12. The method according to claim 11, wherein the processing jobs are generated at a rate that is smaller than a rate of the mission time accurate data frames received from source nodes assigned to a specific mission.

13. The method according to claim 12, wherein the processing jobs are assigned to the recipe-specific processing queues based on recipe-specific rates $F:R_i$, where $R_i$ is an integer number specific to a recipe and the mission, and smaller than Fis a rate of mission time accurate data frames received from source nodes assigned to the specific mission served by the recipe.

14. The method according to claim 13, wherein the recipe-specific rates $F:R_i$ are adapted based on at least one of a number of missions served by a given recipe, a highest a rate of mission time accurate data frames received by a mission served by a given recipe and a lowest rate of mission time accurate data frames received by a mission served by a given recipe.

15. The method according to claim 11, comprising:

n. providing, at the recipient node, at least one user interface component for generating mission dashboards for a plurality of users based on the generated mission-specific analytics information and for receiving user input.

16. The method according to any claim 11, comprising:

delivering mission time accurate data frames and the generated mission-specific analytics information to one or more further recipient nodes.

17. The method according to claim 11, comprising:

receiving, at the recipient node, a redundancy value from at least one of the source nodes;

adjusting, at the recipient node, at least one rule for controlling execution of the analytics recipes based on the received redundancy value.

18. The method according to claim 11, comprising:

determining which analytics recipes have been configured to receive mission time accurate data frames from at least one source node; and adjusting rules for controlling the determined analytics recipes.

19. The method according to claim 11, comprising:

o. storing, at the plurality of source nodes, mission time accurate data frames into buffers for transmission to the recipient node over a host-to-host protocol connection;

p. measuring, at the plurality of source nodes, a connection quality of the host-to-host protocol connection;

q. adjusting, at the plurality of source nodes, one or more target parameters of the transmission on the basis of the measured connection quality;

r. transmitting, by the plurality of source nodes, data frames from the buffer to the recipient node on the basis of a Last-In, First-Out (LIFO) method and the adjusted one or more target parameters.

20. A non-transitory computer readable medium comprising program instructions for causing an apparatus to perform at least the following:

s. receive, at a recipient node connected to a plurality of source nodes over a data connection, mission time accurate data frames from the plurality of source nodes;

t. assign, at the recipient node, each of the plurality of source nodes to a plurality of missions;

u. assign, at the recipient node, analytics recipes to each of the missions, for generating mission-specific analytics information based on the mission time accurate data frames received from the plurality of source nodes assigned to each of the missions, wherein the mission-specific analytics information is generated based on mission specific rules defining a plurality of input parameters including a mission-specific reliability level associated with each respective analytics recipe; and v. generate, at the recipient node, processing jobs for processing the mission time accurate data frames received from the plurality of source nodes assigned to specific missions, wherein the processing jobs are assigned to recipe-specific processing queues of the analytics recipes assigned to the specific missions by adapting a recipe-specific rate for generating the processing jobs based on the plurality of input parameters and available recipe processing resources.

* * * * *